United States Patent
Jiang et al.

(10) Patent No.: US 9,869,431 B2
(45) Date of Patent: Jan. 16, 2018

(54) THERMO-COMPRESSION HEAD, SOLDERING SYSTEM, AND LED TUBE LAMP

(71) Applicant: JIAXING SUPER LIGHTING ELECTRIC APPLIANCE CO., LTD., Zhejiang (CN)

(72) Inventors: Tao Jiang, Zhejiang (CN); Xiaosu Yang, Zhejiang (CN); Bao Wang, Zhejiang (CN); Nobutaka Ota, Okayama County (JP); Xiao Sun, Zhejiang (CN); Changwei Hu, Zhejiang (CN); Guohai Yao, Zhejiang (CN); Shauliang Chen, Taoyuan (TW); Dingkai Wang, New Taipei (TW); Wenjang Jiang, Hsinchu (TW)

(73) Assignee: JIAXING SUPER LIGHTING ELECTRIC APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 15/299,096

(22) Filed: Oct. 20, 2016

(65) Prior Publication Data

US 2017/0038014 A1    Feb. 9, 2017

Related U.S. Application Data

(63) Continuation of application No. 14/865,387, filed on Sep. 25, 2015, now Pat. No. 9,609,711.

(30) Foreign Application Priority Data

Sep. 28, 2014  (CN) .......................... 2014 1 0507660
Sep. 28, 2014  (CN) .......................... 2014 1 0508899

(Continued)

(51) Int. Cl.
*H05B 41/16*   (2006.01)
*H05B 41/24*   (2006.01)
(Continued)

(52) U.S. Cl.
CPC .............. *F21K 9/278* (2016.08); *B23K 3/047* (2013.01); *F21K 9/1375* (2013.01); *F21K 9/27* (2016.08);
(Continued)

(58) Field of Classification Search
None
See application file for complete search history.

(56) References Cited

U.S. PATENT DOCUMENTS 2,454,049 A   11/1948  Floyd, Jr.
3,294,518 A   12/1966  Laseck et al.
(Continued)

FOREIGN PATENT DOCUMENTS

CN   201014273 Y   1/2008
CN   201437921     4/2010
(Continued)

*Primary Examiner* — Anh Tran
(74) *Attorney, Agent, or Firm* — Andrew M. Calderon; Roberts Mlotkowski Safran Cole & Calderon, P.C.

(57) ABSTRACT

A thermo-compression head, a soldering system, and a LED tube lamp are disclosed. The thermo-compression head includes a bonding plane, a restraining plane, one or more concave guiding tank, and one or more concave molding tank. The bonding plane is for touching a second object. The restraining plane is adjacent to the bonding plane for touching a first object soldered to the second object. The concave guiding tank is formed on the bonding plane. An end of the concave guiding tank is opened near an edge of the bonding plane while an opposite end of the concave guiding tank is closed. The concave molding tank is formed on the restraining plane and positioned beside the concave guiding tank.

(Continued)

The concave molding tank communicates with the concave guiding tank via the open end of the concave guiding tank.

20 Claims, 19 Drawing Sheets

(30) Foreign Application Priority Data

| Nov. 6, 2014 | (CN) | 2014 1 0623355 |
|---|---|---|
| Dec. 5, 2014 | (CN) | 2014 1 0734425 |
| Feb. 12, 2015 | (CN) | 2015 1 0075925 |
| Mar. 10, 2015 | (CN) | 2015 1 0104823 |
| Mar. 25, 2015 | (CN) | 2015 1 0133689 |
| Mar. 26, 2015 | (CN) | 2015 1 0134586 |
| Mar. 27, 2015 | (CN) | 2015 1 0136796 |
| Apr. 3, 2015 | (CN) | 2015 1 0155807 |
| Apr. 14, 2015 | (CN) | 2015 1 0173861 |
| Apr. 22, 2015 | (CN) | 2015 1 0193980 |
| May 19, 2015 | (CN) | 2015 1 0259151 |
| May 22, 2015 | (CN) | 2015 1 0268927 |
| May 29, 2015 | (CN) | 2015 1 0284720 |
| Jun. 10, 2015 | (CN) | 2015 1 0315636 |
| Jun. 17, 2015 | (CN) | 2015 1 0338027 |
| Jun. 26, 2015 | (CN) | 2015 1 0364735 |
| Jun. 26, 2015 | (CN) | 2015 1 0372375 |
| Jun. 26, 2015 | (CN) | 2015 1 0373492 |
| Jun. 29, 2015 | (CN) | 2015 1 0378322 |
| Jul. 2, 2015 | (CN) | 2015 1 0391910 |
| Jul. 10, 2015 | (CN) | 2015 1 0406595 |
| Jul. 20, 2015 | (CN) | 2015 1 0428680 |
| Aug. 7, 2015 | (CN) | 2015 1 0482944 |
| Aug. 8, 2015 | (CN) | 2015 1 0483475 |
| Aug. 8, 2015 | (CN) | 2015 1 0486115 |
| Sep. 2, 2015 | (CN) | 2015 1 055543 |
| Sep. 6, 2015 | (CN) | 2015 1 0557717 |
| Sep. 18, 2015 | (CN) | 2015 1 0595173 |

(51) Int. Cl.

| F21K 9/278 | (2016.01) |
|---|---|
| F21V 23/00 | (2015.01) |
| H05B 33/08 | (2006.01) |
| F21V 29/83 | (2015.01) |
| F21K 9/27 | (2016.01) |
| F21K 99/00 | (2016.01) |
| F21V 3/04 | (2006.01) |
| F21V 7/22 | (2006.01) |
| F21V 15/015 | (2006.01) |
| F21V 17/10 | (2006.01) |
| F21V 23/02 | (2006.01) |
| F21K 9/272 | (2016.01) |
| B23K 3/047 | (2006.01) |
| F21Y 103/00 | (2016.01) |
| F21Y 101/00 | (2016.01) |
| F21Y 101/02 | (2006.01) |
| F21Y 115/10 | (2016.01) |
| F21Y 103/10 | (2016.01) |
| B23K 101/42 | (2006.01) |
| F21V 25/04 | (2006.01) |

(52) U.S. Cl.
CPC ............ *F21K 9/272* (2016.08); *F21V 3/0418* (2013.01); *F21V 3/0472* (2013.01); *F21V 7/22* (2013.01); *F21V 15/015* (2013.01); *F21V 17/101* (2013.01); *F21V 23/009* (2013.01); *F21V 23/02* (2013.01); *F21V 29/83* (2015.01); *H05B 33/0803* (2013.01); *H05B 33/0809* (2013.01); *H05B 33/0815* (2013.01); *H05B 33/0845* (2013.01); *H05B 33/0884* (2013.01); *B23K 2201/42* (2013.01); *F21V 25/04* (2013.01); *F21Y 2101/00* (2013.01); *F21Y 2101/02* (2013.01); *F21Y 2103/003* (2013.01); *F21Y 2103/10* (2016.08); *F21Y 2115/10* (2016.08)

(56) References Cited

U.S. PATENT DOCUMENTS

| 4,156,265 | A | 5/1979 | Rose |
|---|---|---|---|
| 4,647,399 | A | 3/1987 | Peters et al. |
| 5,575,459 | A | 11/1996 | Anderson |
| 5,921,660 | A | 7/1999 | Yu |
| 6,118,072 | A | 9/2000 | Scott |
| 6,127,783 | A | 10/2000 | Pashley et al. |
| 6,211,262 | B1 | 4/2001 | Mejiritski et al. |
| 6,609,813 | B1 | 8/2003 | Showers et al. |
| 6,796,680 | B1 | 9/2004 | Showers et al. |
| 6,860,628 | B2 | 3/2005 | Robertson et al. |
| 6,936,855 | B1 | 8/2005 | Harrah et al. |
| 7,033,239 | B2 | 4/2006 | Cunkelman et al. |
| 7,067,032 | B1 | 6/2006 | Bremont et al. |
| 7,594,738 | B1 | 9/2009 | Lin et al. |
| 8,360,599 | B2 | 1/2013 | Ivey et al. |
| 8,456,075 | B2 | 6/2013 | Axelsson |
| 8,579,463 | B2 | 11/2013 | Clough |
| D761,216 | S | 7/2016 | Jiang |
| 9,447,929 | B2 | 9/2016 | Jiang |
| D768,891 | S | 10/2016 | Jiang et al. |
| 2002/0044456 | A1 | 4/2002 | Balestriero et al. |
| 2003/0231485 | A1 | 12/2003 | Chien |
| 2004/0095078 | A1 | 5/2004 | Leong |
| 2004/0189218 | A1 | 9/2004 | Leong et al. |
| 2005/0128751 | A1 | 6/2005 | Roberge et al. |
| 2005/0162850 | A1 | 7/2005 | Luk et al. |
| 2005/0207166 | A1 | 9/2005 | Kan et al. |
| 2005/0213321 | A1 | 9/2005 | Lin |
| 2006/0028837 | A1 | 2/2006 | Mrakovich et al. |
| 2007/0001709 | A1 | 1/2007 | Shen |
| 2007/0145915 | A1 | 6/2007 | Roberge et al. |
| 2007/0210687 | A1 | 9/2007 | Axelsson |
| 2007/0274084 | A1 | 11/2007 | Kan et al. |
| 2008/0030981 | A1 | 2/2008 | Mrakovich et al. |
| 2008/0192476 | A1 | 8/2008 | Hiratsuka |
| 2008/0278941 | A1 | 11/2008 | Logan et al. |
| 2008/0290814 | A1 | 11/2008 | Leong et al. |
| 2009/0140271 | A1 | 6/2009 | Sah |
| 2009/0159919 | A1 | 6/2009 | Simon et al. |
| 2009/0161359 | A1 | 6/2009 | Siemiet et al. |
| 2010/0085772 | A1 | 4/2010 | Song et al. |
| 2010/0103673 | A1 | 4/2010 | Ivey et al. |
| 2010/0177532 | A1 | 7/2010 | Simon et al. |
| 2010/0253226 | A1 | 10/2010 | Oki |
| 2011/0038146 | A1 | 2/2011 | Chen |
| 2011/0057572 | A1 | 3/2011 | Kit et al. |
| 2011/0090684 | A1 | 4/2011 | Logan et al. |
| 2011/0216538 | A1 | 9/2011 | Logan et al. |
| 2011/0309258 | A1* | 12/2011 | Ishida ............... G01T 1/20 250/369 |
| 2012/0049684 | A1 | 3/2012 | Bodenstein et al. |
| 2012/0069556 | A1 | 3/2012 | Bertram et al. |
| 2012/0106157 | A1 | 5/2012 | Simon et al. |
| 2012/0146503 | A1 | 6/2012 | Negley et al. |
| 2012/0153873 | A1 | 6/2012 | Hayashi et al. |
| 2012/0169968 | A1 | 7/2012 | Ishimori et al. |
| 2012/0293991 | A1 | 11/2012 | Lin |
| 2012/0319150 | A1 | 12/2012 | Shimomura et al. |
| 2013/0021809 | A1 | 1/2013 | Dellian et al. |
| 2013/0033881 | A1 | 2/2013 | Terazawa et al. |
| 2013/0033888 | A1 | 2/2013 | Wel et al. |
| 2013/0050998 | A1 | 2/2013 | Chu et al. |
| 2013/0069538 | A1 | 3/2013 | So |
| 2013/0094200 | A1 | 4/2013 | Dellian et al. |

(56) References Cited

U.S. PATENT DOCUMENTS

| | | |
|---|---|---|
| 2013/0170196 A1 | 7/2013 | Huang et al. |
| 2013/0170245 A1 | 7/2013 | Hong et al. |
| 2013/0175324 A1* | 7/2013 | Chang .................... H01L 24/75 228/101 |
| 2013/0182425 A1 | 7/2013 | Seki et al. |
| 2013/0250565 A1 | 9/2013 | Chiang et al. |
| 2013/0256704 A1 | 10/2013 | Hsiao et al. |
| 2014/0071667 A1 | 3/2014 | Hayashi et al. |
| 2014/0153231 A1 | 6/2014 | Bittmann |
| 2014/0226320 A1 | 8/2014 | Halliwell et al. |
| 2015/0009688 A1 | 1/2015 | Timmermans et al. |
| 2016/0091156 A1 | 3/2016 | Li et al. |
| 2016/0091179 A1 | 3/2016 | Jiang et al. |
| 2016/0178137 A1 | 6/2016 | Jiang |
| 2016/0178138 A1 | 6/2016 | Jiang |
| 2016/0215936 A1 | 7/2016 | Jiang |
| 2016/0215937 A1 | 7/2016 | Jiang |
| 2016/0290566 A1 | 10/2016 | Jiang et al. |
| 2016/0290567 A1 | 10/2016 | Jiang et al. |
| 2016/0290568 A1 | 10/2016 | Jiang et al. |
| 2016/0290569 A1 | 10/2016 | Jiang et al. |
| 2016/0290570 A1 | 10/2016 | Jiang et al. |
| 2016/0290598 A1 | 10/2016 | Jiang |
| 2016/0290609 A1 | 10/2016 | Jiang et al. |
| 2016/0295706 A1 | 10/2016 | Jiang |
| 2016/0341414 A1 | 11/2016 | Jiang |
| 2017/0038012 A1 | 2/2017 | Jiang et al. |
| 2017/0038013 A1 | 2/2017 | Liu et al. |
| 2017/0038014 A1 | 2/2017 | Jiang et al. |
| 2017/0089521 A1 | 3/2017 | Jiang |
| 2017/0089530 A1 | 3/2017 | Jiang |

FOREIGN PATENT DOCUMENTS

| | | |
|---|---|---|
| CN | 102116460 | 7/2011 |
| CN | 102121578 | 7/2011 |
| CN | 202125774 | 1/2012 |
| CN | 102518972 | 6/2012 |
| CN | 102720901 | 10/2012 |
| CN | 102777788 | 11/2012 |
| CN | 102889446 | 1/2013 |
| CN | 202791824 Y | 3/2013 |
| CN | 203240337 | 10/2013 |
| CN | 203240337 U | 10/2013 |
| CN | 203363984 | 12/2013 |
| CN | 203384716 U | 1/2014 |
| CN | 203413396 U | 1/2014 |
| CN | 203453866 U | 2/2014 |
| CN | 103742875 | 4/2014 |
| CN | 203585876 U | 5/2014 |
| CN | 203615157 | 5/2014 |
| CN | 103851547 | 6/2014 |
| CN | 203771102 | 8/2014 |
| CN | 203797382 | 8/2014 |
| CN | 104033772 | 9/2014 |
| CN | 203927469 | 11/2014 |
| CN | 203963553 U | 11/2014 |
| CN | 204042527 | 12/2014 |
| CN | 204201535 U | 3/2015 |
| CN | 204268162 | 4/2015 |
| CN | 204300737 | 4/2015 |
| CN | 104595765 | 5/2015 |
| CN | 204420636 | 6/2015 |
| CN | 104776332 | 7/2015 |
| CN | 104832813 | 8/2015 |
| CN | 204573639 | 8/2015 |
| GB | 2523275 | 8/2015 |
| JP | 2008117666 | 5/2008 |
| JP | 2011061056 | 3/2011 |
| JP | 2014154479 | 8/2014 |
| KR | 20120000551 | 1/2012 |
| WO | 2011132120 | 10/2011 |
| WO | 2013125803 | 8/2013 |
| WO | 2014001475 | 1/2014 |
| WO | 2014117435 | 8/2014 |
| WO | 2014118754 | 8/2014 |
| WO | 2015036478 | 3/2015 |
| WO | 2016086901 | 6/2016 |

* cited by examiner

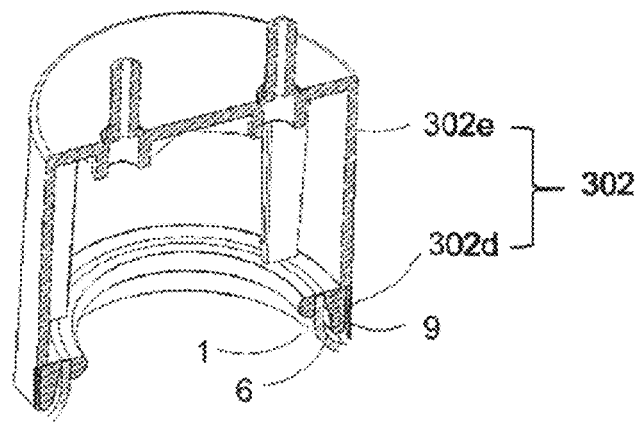
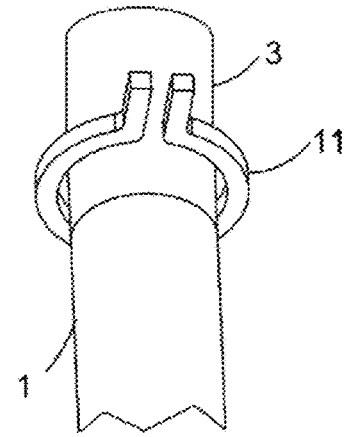
Fig. 6  Fig. 7
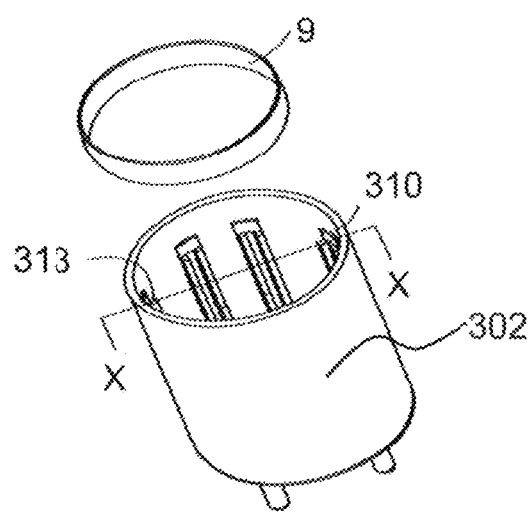
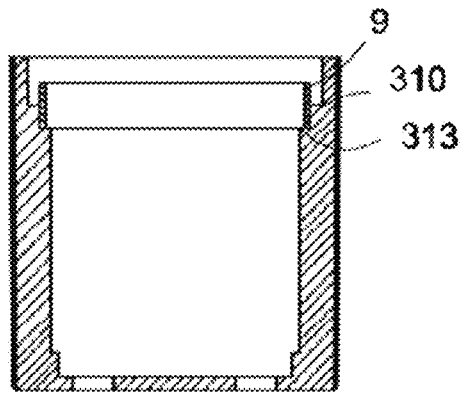
Fig. 8  Fig. 9

Fig. 10
Fig. 11
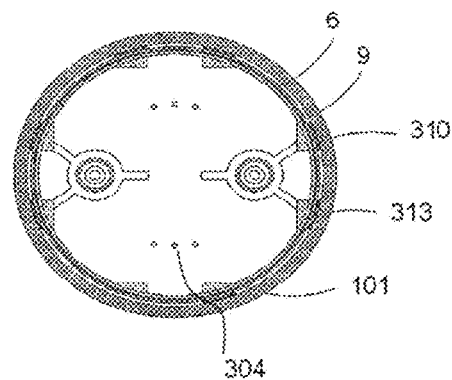 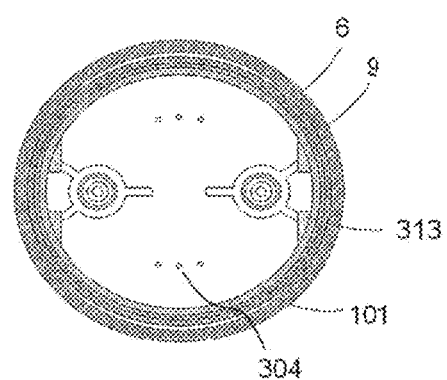
Fig. 12          Fig. 13

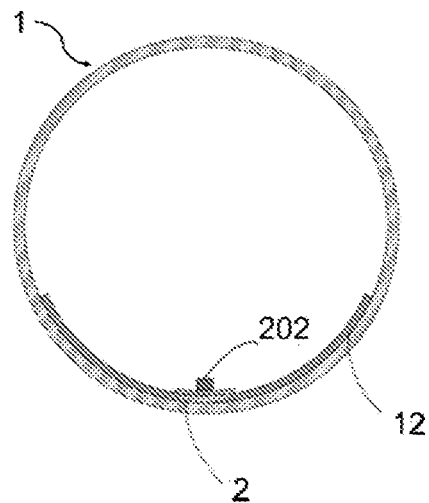
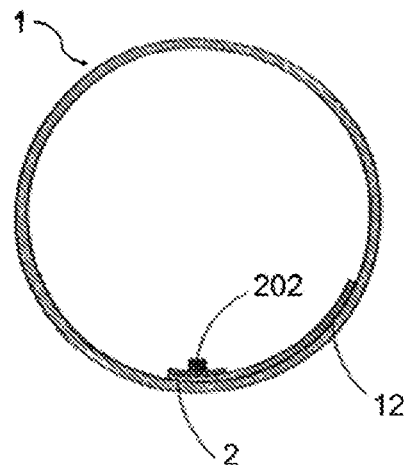
Fig. 19
Fig. 20
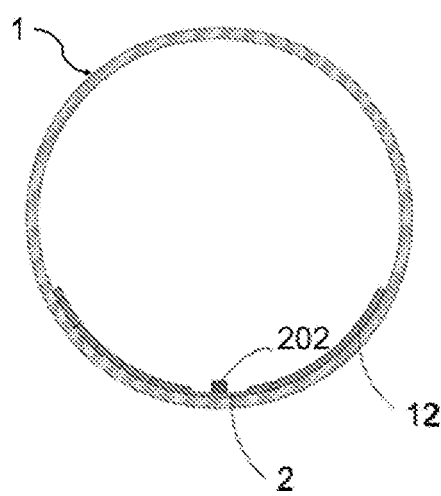
Fig. 21

110

THERMO-COMPRESSION HEAD, SOLDERING SYSTEM, AND LED TUBE LAMP

CROSS-REFERENCE TO RELATED APPLICATIONS

This application is a continuation application of U.S. application Ser. No. 14/865,387 filed in United States on Sep. 25, 2015, which itself claims Chinese priorities under 35 U.S.C. §119(a) of Patent Applications No. CN 201410507660.9 filed on 2014 Sep. 28; CN 201410508899.8 filed on 2014 Sep. 28; CN 201410623355.6 filed on 2014 Nov. 6; CN 201410734425.5 filed on 2014 Dec. 5; CN 201510075925.7 filed on 2015 Feb. 12; CN 201510104823.3 filed on 2015 Mar. 11; CN 201510134586.5 filed on 2015 Mar. 26; CN 201510133689.x filed on 2015 Mar. 25; CN 201510136796.8 filed on 2015 Mar. 27; CN 201510173861.4 filed on 2015 Apr. 14; CN 201510155807.7 filed on 2015 Apr. 3; CN 201510193980.6 filed on 2015 Apr. 22; CN 201510372375.5 filed on 2015 Jun. 26; CN 201510259151.3 filed on 2015 May 19; CN 201510268927.8 filed on 2015 May 22; CN 201510284720.x filed on 2015 May 29; CN 201510338027.6 filed on 2015 Jun. 17; CN 201510315636.x filed on 2015 Jun. 10; CN 201510373492.3 filed on 2015 Jun. 26; CN 201510364735.7 filed on 2015 Jun. 26; CN 201510378322.4 filed on 2015 Jun. 29; CN 201510391910.1 filed on 2015 Jul. 2; CN 201510406595.5 filed on 2015 Jul. 10; CN 201510482944.1 filed on 2015 Aug. 7; CN 201510486115.0 filed on 2015 Aug. 8; CN 201510428680.1 filed on 2015 Jul. 20; CN 201510483475.5 filed on 2015 Aug. 8; CN 201510555543.4 filed on 2015 Sep. 2; CN 201510557717.0 filed on 2015 Sep. 6; and CN 201510595173.7 filed on 2015 Sep. 18, the disclosures of which are incorporated herein in their entirety by reference.

FIELD OF THE INVENTION

The present disclosure relates to illumination devices and manufacturing equipment, and more particularly to an LED tube lamp and its components including the light sources, electronic components, and end caps and to a thermo-compression head and a soldering system for manufacturing the components of the LED tube lamp.

BACKGROUND

LED lighting technology is rapidly developing to replace traditional incandescent and fluorescent lightings. LED tube lamps are mercury-free in comparison with fluorescent tube lamps that need to be filled with inert gas and mercury. Thus, it is not surprising that LED tube lamps are becoming a highly desired illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption; therefore, when taking into account all factors, they would typically be considered as a cost effective lighting option.

Typical LED tube lamps have a lamp tube, a circuit board disposed inside the lamp tube with light sources being mounted on the circuit board, and end caps accompanying a power supply provided at two ends of the lamp tube with the electricity from the power supply transmitting to the light sources through the circuit board. However, existing LED tube lamps have certain drawbacks.

First, the typical circuit board is rigid and allows the entire lamp tube to maintain a straight tube configuration when the lamp tube is partially ruptured or broken, and this gives the user a false impression that the LED tube lamp remains usable and is likely to cause the user to be electrically shocked upon handling or installation of the LED tube lamp.

Second, the rigid circuit board is typically electrically connected with the end caps by way of wire bonding, in which the wires may be easily damaged and even broken due to any move during manufacturing, transportation, and usage of the LED tube lamp and therefore may disable the LED tube lamp.

Third, the lamp tube and the end caps are often secured together by using hot melt adhesive or silicone adhesive, and it is hard to prevent the buildup of excess (overflown) adhesive residues. This may cause light blockage as well as an unpleasant aesthetic appearance. In addition, a large amount of manpower is required to clean off the excessive adhesive buildup, create a further production bottleneck and inefficiency. Also, bad heat dissipation of the power supply components inside the end caps can cause a high temperature and therefore reduces life span of the hot melt adhesive and simultaneously disables the adhesion between the lamp tube and the end caps, which may decrease the reliability of the LED tube lamp.

Fourth, the typical lamp tube is a long cylinder sleeved with the end caps at ends by means of adhesive, in which the end caps each has a larger diameter than that of the lamp tube. In this way, a packing box for the lamp tube—which is also typically in cylinder shape—will contact only the end caps such that only the end caps are supported and the connecting part between the end caps and the lamp tube is apt to break, such as disclosed LED tube lamp in a published US patent application with publication no. US 2014226320 and a published CN patent application with publication no. CN 102518972. To address this issue, a published US patent application with publication no. US 20100103673 discloses an end cap that is sealed and inserted into a glass made lamp tube. However, this kind of lamp tube is subjected to inner stresses at its ends and may easily break when the ends are subjected to external forces, which may lead to product defects and quality issues.

Fifth, grainy visual appearances are also often found in the aforementioned conventional LED tube lamp. The LED chips spatially arranged on the circuit board inside the lamp tube are considered as spot light sources, and the lights emitted from these LED chips generally do not contribute uniform illuminance for the LED tube lamp without proper optical manipulation. As a result, the entire tube lamp would exhibit a grainy or non-uniform illumination effect to a viewer of the LED tube lamp, thereby negatively affecting the visual comfort and even narrowing the viewing angles of the lights. As a result, the quality and aesthetics requirements of average consumers would not be satisfied. To address this issue, the Chinese patent application with application no. CN 201320748271.6 discloses a diffusion tube is disposed inside a glass lamp tube to avoid grainy visual effects.

However, the disposition of the diffusion tube incurs an interface on the light transmission path to increase the likelihood of total reflection and therefore decrease the light outputting efficiency. In addition, the optical rotatory absorption of the diffusion tube decreases the light outputting efficiency.

Further, soldering pads on the circuit board with the light sources and the soldering pads on the power supply are soldered together. However, the connection between the circuit board with the light sources and the power supply is not firm when tin solders on the soldering pads melt and bleed out. The circuit board intervening between a soldering equipment and the tin solders also causes negative influence to the connection. Moreover, the soldering equipment is not able to fit the tin solders when the heights of tin solders on the soldering pads are not identical.

Accordingly, the prevent disclosure and its embodiments are herein provided.

SUMMARY OF THE INVENTION

It's specially noted that the present disclosure may actually include one or more inventions claimed currently or not yet claimed, and for avoiding confusion due to unnecessarily distinguishing between those possible inventions at the stage of preparing the specification, the possible plurality of inventions herein may be collectively referred to as "the (present) invention" herein.

Various embodiments are summarized in this section, and are described with respect to the "present invention," which terminology is used to describe certain presently disclosed embodiments, whether claimed or not, and is not necessarily an exhaustive description of all possible embodiments, but rather is merely a summary of certain embodiments. Certain of the embodiments described below as various aspects of the "present invention" can be combined in different manners to form an LED tube lamp or a portion thereof.

The present invention provides a novel LED tube lamp, and aspects thereof.

The present invention provides an LED tube lamp including a lamp tube and a set of end caps secured to the ends of the lamp tube, wherein the end caps each may have an electrically insulating tube and a thermal conductive member which is fixedly disposed on an outer circumferential surface of the electrically insulating tube and adhered to an outer surface of the lamp tube by using adhesive.

The present invention also provides an LED tube lamp including a lamp tube and two differently sized end caps respectively secured to two ends of the lamp tube. The size of one end cap may be 30% to 80% of the size of the other end cap in some embodiments.

The present invention provides an LED tube lamp including a lamp tube, an end cap disposed at one end of the lamp tube, a power supply provided inside the end cap, a LED light strip disposed inside the lamp tube with light sources mounted on the LED light strip, wherein the LED light strip has a bendable circuit sheet to electrically connect the light sources and the power supply.

The bendable circuit sheet may be a conductive wiring layer, and the light sources are mounted on the conductive wiring layer to allow electrical connection between the light sources and the power supply through the conductive wiring layer.

The bendable circuit sheet may further include a dielectric layer stacked on the conductive wiring layer. The dielectric layer may be stacked on a surface of the conductive wiring layer that is opposite to the surface having the light sources. The dielectric layer may be mounted onto the inner surface of the lamp tube. In some embodiments, a ratio of the circumferential length of the bendable circuit sheet to the circumferential length of the inner surface of the lamp tube is about 0.3 to 0.5.

The bendable circuit sheet may further include a circuit protection layer.

The bendable circuit sheet and the power supply may be connected by wire bonding.

The bendable circuit sheet may be disposed on the reflective film.

The bendable circuit sheet may be disposed on one side of the reflective film.

The bendable circuit sheet may be disposed such that the reflective film is disposed on two sides of the bendable circuit sheet and extends along the circumferential direction of the lamp tube.

The lamp tube may have adhesive film on the inner surface or outer surface thereof to isolate inside and outside of the lamp tube that is broken.

The bendable circuit sheet may have its ends pass through the transition region to reach and electrically connect the power supply.

The bendable circuit sheet may have a set of conductive wiring layers and a set of dielectric layers that are stacked in a staggered manner and the light sources are disposed on the outmost conductive wiring layer through which the electrical power supplies.

The bendable circuit sheet may be positioned along the axial direction of the lamp tube and have its ends detached from an inner surface of the lamp tube. The bendable circuit sheet may have its ends extend beyond two ends of the lamp tube to respectively form two freely extending end portions with the freely extending end portions being curled up, coiled or deformed in shape to be fittingly accommodated inside the lamp tube.

The power supply may be in the form of a single integrated unit (e.g., with all components of the power supply are within a body) disposed in an end cap at one end of the lamp tube. Alternatively, the power supply may be in form of two separate parts (e.g., with the components of the power supply are separated into two pieces) respectively disposed in two end caps.

The end cap may include a socket for connection with a power supply.

The power supply may have a metal pin at one end, while the end cap may be provided with a hollow conductive pin to accommodate the metal pin of the power supply.

The bendable circuit sheet may be connected to the power supply via soldering bonding.

The LED light strip may be connected to the power supply by utilizing a circuit-board assembly which has a long circuit sheet and a short circuit board that are adhered to each other with the short circuit board being adjacent to the side edge of the long circuit sheet. The short circuit board may be provided with a power supply module to form the power supply. The short circuit board is stiffer than the long circuit sheet to be able to support the power supply module. The long circuit sheet may be the bendable circuit sheet of the LED light strip.

The short circuit board may have a length generally of about 15 mm to about 40 mm and may preferably be about 19 mm to about 36 mm, while the long circuit sheet may have a length generally of about 800 mm to about 2800 mm and may preferably be about 1200 mm to about 2400 mm. In some embodiments, a ratio of the length of the short circuit board to the length of the long circuit sheet ranges from about 1:20 to about 1:200.

The short circuit board may be a hard circuit board to support the power supply module.

The power supply module and the long circuit sheet may be arranged on the same side of the short circuit board such that the power supply module is directly connected to the long circuit sheet. Alternatively, the power supply module and the long circuit sheet may be arranged on opposite sides of the short circuit board, respectively, such that the power supply module is directly connected to the short circuit board and further connected to the wiring layer of the long circuit sheet.

The power supply module may be connected to the end of the short circuit board in a perpendicular manner (such that the printed circuit board supporting the power supply module of the power supply is not parallel but may be perpendicular to the short circuit board).

The bendable circuit sheet may have parts to be curled up, coiled or deformed in shape to be fittingly accommodated inside the lamp tube by forming freely extending portion at ends of the bendable circuit sheet along the axial direction of the lamp tube. Therefore, the manufacturing and assembling process of the LED lamp tube become more convenient.

The connection between the bendable circuit sheet and the power supply inside the end cap may be firmly secured by directly soldering the bendable circuit sheet to the output terminal of the power supply.

The connection between the bendable circuit sheet and the printed circuit board supporting the power supply module of the power supply may be strengthened and not break easily by utilizing a circuit board assembly.

The design and manufacturing flexibility of the LED tube lamp is increased by utilizing different types of power supply modules for the power supply.

The present invention provides embodiments of a thermo-compression head for heating a solder and bonding at least one first soldering pad on a first object and at least one second soldering pad on a second object. The first object overlays a part of the second object. The at least one second soldering pad is between the first object and the second object. The at least one first soldering pad is aligned with the at least one second soldering pad. The thermo-compression head comprises a bonding plane, a restraining plane, at least one concave guiding tank, and at least one concave molding tank. The bonding plane is for touching the second object. The restraining plane is adjacent to the bonding plane for touching the first object. The at least one concave guiding tank is formed on the bonding plane. An end of the at least one concave guiding tank is opened near an edge of the bonding plane while an opposite end of the at least one concave guiding tank is closed. The at least one concave molding tank is formed on the restraining plane and is positioned beside the at least one concave guiding tank. The at least one concave molding tank communicates with the at least one concave guiding tank via the open end of the at least one concave guiding tank.

In some embodiments, the at least one concave molding tank is more depressed than the at least one concave guiding tank.

In some embodiments, the restraining plane is lower than the bonding plane to form a difference of height of the bonding plane and the restraining plane.

In some embodiments, the difference of height of the bonding plane and the restraining plane is substantially equal to a thickness of the first object.

In some embodiments, an end of the at least one concave molding tank is opened near an edge of the restraining plane to communicate with the at least one concave guiding tank while an opposite end of the at least one concave molding tank is opened near an opposite edge of the restraining plane.

In some embodiments, the restraining plane has a strip-like structure or a grid-like structure on a surface for pressing the first object.

In some embodiments, the bonding plane has a surface being flat, concave, or convex for touching the second object.

In some embodiments, the bonding plane is for heating a solder.

In some embodiments, the first object is an LED light strip, the second object is a power supply, the at least one first soldering pad is on a side of the LED light strip away from the power supply, and the at least one first soldering pad is formed with a through hole and is able to be connected to the at least one second soldering pad via the through hole.

In some embodiments, the thermo-compression head further comprises a rotary linkage mechanism. The bonding plane and the restraining plane are connected to the rotary linkage mechanism.

In some embodiments, the thermo-compression head further comprises a pressure sensor. The pressure sensor detects the pressure applied to the bonding plane or the restraining plane.

The present invention provides embodiments of a soldering system for heating a solder and bonding at least one first soldering pad on a first object and at least one second soldering pad on a second object. The first object overlays a part of the second object. The at least one second soldering pad is between the first object and the second object. The at least one first soldering pad is aligned with the at least one second soldering pad. The soldering system comprises a soldering vehicle and the aforementioned thermo-compression head. The soldering vehicle comprises a rotary platform and a vehicle holder. The rotary platform is for holding the first object and the second object. The vehicle holder bears the rotary platform. The rotary platform is able to rotate with respect to the vehicle holder. The thermo-compression head is positioned corresponding to the rotary platform.

The present invention provides embodiments of an LED tube lamp. The LED tube lamp is manufactured by a soldering system for heating a solder and bonding at least one first soldering pad on a first object and at least one second soldering pad on a second object. The first object overlays a part of the second object. The at least one second soldering pad is between the first object and the second object. The at least one first soldering pad is aligned with the at least one second soldering pad.

According to embodiments of the present invention, the LED tube lamp comprises a lamp tube, two end caps, a power supply, and an LED light strip. The two end caps are respectively at two opposite ends of the lamp tube. The power supply is in one or separately in both of the end caps. The LED light strip is in the lamp tube. The LED light strip is provided with a plurality of LED light sources mounted thereon. The LED light sources is electrically connected to the power supply via the LED light strip. The LED light strip overlays a part of the power supply. The LED light strip comprises at least one first soldering pad. The power supply comprises at least one second soldering pad. The at least one second soldering pad is between the LED light strip and the power supply. The at least one first soldering pad is aligned with the at least one second soldering pad. The at least one first soldering pad is connected to the at least one second soldering pad via a solder.

In some embodiments, the at least one first soldering pad is on a side of the LED light strip away from the power supply, and the at least one first soldering pad is formed with a through hole and is connected to the at least one second soldering pad via the through hole.

In some embodiments, a part of the solder is in the through hole and another part of the solder is around an edge of the LED light strip.

In some embodiments, the two end caps have different sizes in a length direction along the axle of the end caps.

In some embodiments, the size of one of the end caps is substantially 30% to 80% times the size of the other one of the end caps.

According to embodiments of the present invention, the soldering pads on the LED light strip and the soldering pads on the printed circuit board of the power supply can be firmly soldered together. The tin solders on the soldering pads can be received by the tank to form solder balls and won't bleed out. The thermo-compression head is rotatable to fit tin solders even if the heights of solders on the soldering pads are not identical. After soldering, the tin solders between the LED light strip and the power supply can function as rivets to enhance the secure capability of the electrically connecting structure.

BRIEF DESCRIPTION OF THE DRAWINGS

FIG. 6 is a perspective cross-sectional view schematically illustrating inner structure of an all-plastic end cap (having a magnetic metal member and hot melt adhesive inside) according to another embodiment of the present invention;

FIG. 7 is a perspective view schematically illustrating the all-plastic end cap and the lamp tube being bonded together by utilizing an induction coil according to certain embodiments of the present invention;

FIG. 8 is a perspective view schematically illustrating a supporting portion and a protruding portion of the electrically insulating tube of the end cap of the LED tube lamp according to the another embodiment of the present invention;

FIG. 9 is an exemplary plane cross-sectional view schematically illustrating the inner structure of the electrically insulating tube and the magnetic metal member of the end cap of FIG. 8 taken along a line X—X;

FIG. 10 is a plane view schematically illustrating the configuration of the openings on surface of the magnetic metal member of the end cap of the LED tube lamp according to the another embodiment of the present invention;

FIG. 11 is a plane view schematically illustrating the indentation/embossment on a surface of the magnetic metal member of the end cap of the LED tube lamp according to certain embodiments of the present invention;

FIG. 12 is an exemplary plane cross-sectional view schematically illustrating the structure of the connection of the end cap of FIG. 8 and the lamp tube along a radial axis of the lamp tube, where the electrically insulating tube is in shape of a circular ring;

FIG. 13 is an exemplary plane cross-sectional view schematically illustrating the structure of the connection of the end cap of FIG. 8 and the lamp tube along a radial axis of the lamp tube, where the electrically insulating tube is in shape of an elliptical or oval ring;

FIG. 19 is a plane cross-sectional view schematically illustrating inside structure of the lamp tube of the LED tube lamp according to still another embodiment of the present invention, wherein the reflective film is under the LED light strip and extends at both sides along the circumferential direction of the lamp tube;

FIG. 20 is a plane cross-sectional view schematically illustrating inside structure of the lamp tube of the LED tube lamp according to yet another embodiment of the present invention, wherein the reflective film is under the LED light strip and extends at only one side along the circumferential direction of the lamp tube;

FIG. 21 is a plane cross-sectional view schematically illustrating inside structure of the lamp tube of the LED tube lamp according to still yet another embodiment of the present invention, wherein two reflective films are respectively adjacent to two sides of the LED light strip and extending along the circumferential direction of the lamp tube;

DETAILED DESCRIPTION

Figure 1:
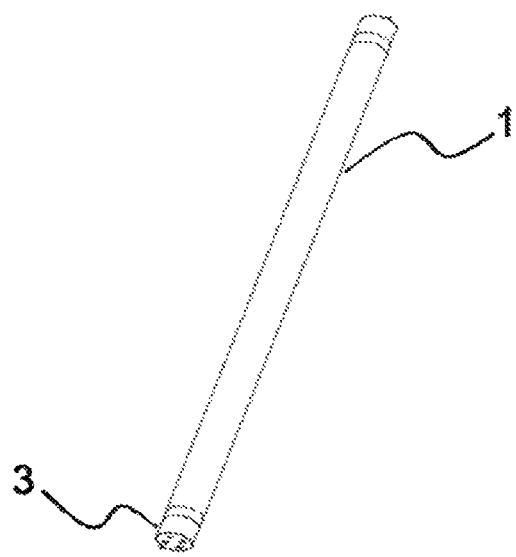
FIG. 1 is a perspective view schematically illustrating an LED tube lamp according to one embodiment of the present invention.

The present disclosure provides a novel LED tube lamp. The present disclosure will now be described in the following embodiments with reference to the drawings. The following descriptions of various embodiments of this invention are presented herein for purpose of illustration and giving examples only. It is not intended to be exhaustive or to be limited to the precise form disclosed. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of components may be exaggerated for clarity. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, third etc. may be used herein to describe various elements, components, regions, layers, or steps, these elements, components, regions, layers, and/or steps should not be limited by these terms. Unless the context indicates otherwise, these terms are only used to distinguish one element, component, region, layer, or step from another element, component, region, or step, for example as a naming convention. Thus, a first element, component, region, layer, or step discussed below in one section of the specification could be termed a second element, component, region, layer, or step in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected," to each other are electrically connected through one or more passive elements, such as, for example, wires, pads, internal electrical lines, resistors, etc. As such, directly electrically connected components do not include components electrically connected through active elements, such as transistors or diodes.

Components described as thermally connected or in thermal communication are arranged such that heat will follow a path between the components to allow the heat to transfer from the first component to the second component. Simply because two components are part of the same device or board does not make them thermally connected. In general, components which are heat-conductive and directly connected to other heat-conductive or heat-generating components (or connected to those components through intermediate heat-conductive components or in such close proximity as to permit a substantial transfer of heat) will be described as thermally connected to those components, or in thermal communication with those components. On the contrary, two components with heat-insulative materials therebetween, which materials significantly prevent heat transfer between the two components, or only allow for incidental heat transfer, are not described as thermally connected or in thermal communication with each other. The terms "heat-conductive" or "thermally-conductive" do not apply to any material that provides incidental heat conduction, but are intended to refer to materials that are typically known as good heat conductors or known to have utility for transferring heat, or components having similar heat conducting properties as those materials.

Figure 2:
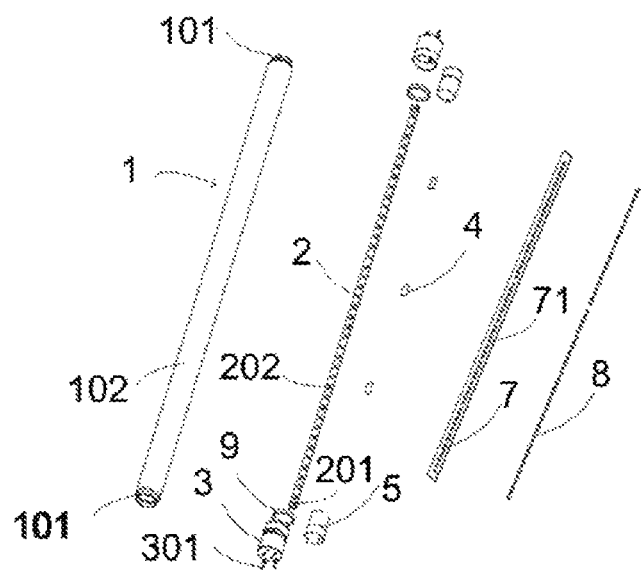
FIG. 2 is an exemplary exploded view schematically illustrating the LED tube lamp shown in FIG. 1.

Referring to FIGS. 1 and 2, an LED tube lamp of one embodiment of the present invention includes a lamp tube 1, an LED light strip 2 disposed inside the lamp tube 1, and two end caps 3 respectively disposed at two ends of the lamp tube 1. The lamp tube 1 may be made of plastic or glass. The sizes of the two end caps 3 may be same or different.

Figure 1A:
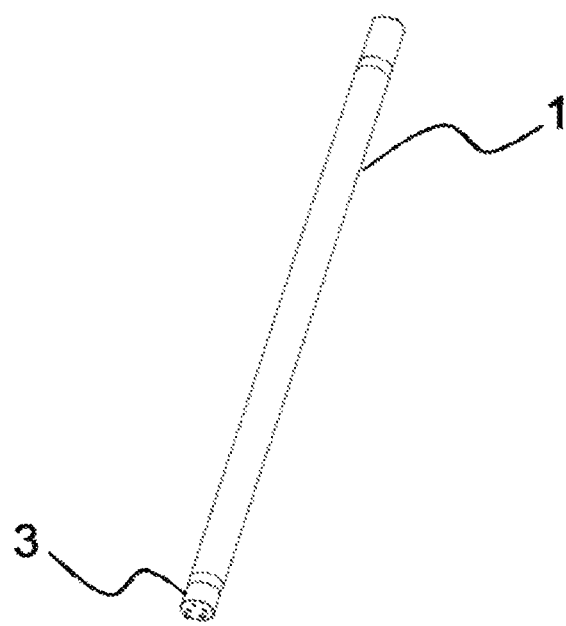
FIG. 1A is a perspective view schematically illustrating the different sized end caps of an LED tube lamp according to another embodiment of the present invention to illustrate.

Referring to FIG. 1A, the size of one end cap may in some embodiments be about 30% to about 80% times the size of the other end cap.

In one embodiment, the lamp tube 1 is made of glass with strengthened or tempered structure to avoid being easily broken and incurring electrical shock occurred to conventional glass made tube lamps, and to avoid the fast aging process that often occurs in plastic made tube lamps. The glass made lamp tube 1 may be additionally strengthened or tempered by a chemical tempering method or a physical tempering method in various embodiments of the present invention.

An exemplary chemical tempering method is accomplished by exchanging the Na ions or K ions on the glass surface with other alkali metal ions and therefore changes composition of the glass surface. The sodium (Na) ions or potassium (K) ions and other alkali metal ions on the glass surface are exchanged to form an ion exchange layer on the glass surface. The glass is then under tension on the inside while under compression on the outside when cooled to room temperature, so as to achieve the purpose of increased strength. The chemical tempering method includes but is not limited to the following glass tempering methods: high temperature type ion exchange method, the low temperature type ion exchange method, dealkalization, surface crystallization, and/or sodium silicate strengthening methods, further explained as follows.

An exemplary embodiment of the high temperature type ion exchange method includes the following steps: Inserting glass containing sodium oxide ($Na_2O$) or potassium oxide ($K_2O$) in the temperature range of the softening point and glass transition point into molten salt of lithium, so that the Na ions in the glass are exchanged for Li ions in the molten salt. Later, the glass is then cooled to room temperature, since the surface layer containing Li ions has a different expansion coefficient with respect to the inner layer containing Na ions or K ions, thus the surface produces residual stress and is reinforced. Meanwhile, the glass containing $Al_2O_3$, $TiO_2$ and other components, by performing ion exchange, can produce glass crystals having an extremely low coefficient of expansion. The crystallized glass surface after cooling produces a significant amount of pressure, up to 700 MPa, which can enhance the strength of glass.

An exemplary embodiment of the low-temperature ion exchange method includes the following steps: First, a monovalent cation (e.g., K ions) undergoes ion exchange with the alkali ions (e.g. Na ion) on the surface layer at a temperature range that is lower than the strain point temperature, so as to allow the K ions to penetrate the surface. For example, for manufacturing a $Na_2O+CaO+SiO_2$ system glass, the glass can be impregnated for ten hours at more than four hundred degrees in the molten salt. The low temperature ion exchange method can easily obtain glass of higher strength, and the processing method is simple, does not damage the transparent nature of the glass surface, and does not undergo shape distortion.

An exemplary embodiment of dealkalization includes treating glass using platinum (Pt) catalyst along with sulfurous acid gas and water in a high temperature atmosphere. The $Na^+$ ions are migrated out and bleed from the glass surface to be reacted with the Pt catalyst, so that the surface layer becomes a $SiO_2$ enriched layer, which results in a low expansion glass and produces compressive stress upon cooling.

The surface crystallization method and the high temperature type ion exchange method are different, but only the surface layer is treated by heat treatment to form low expansion coefficient microcrystals on the glass surface, thus reinforcing the glass.

An exemplary embodiment of the sodium silicate glass strengthening method is a tempering method using sodium silicate (water glass) in water solution at 100 degrees Celsius and several atmospheres of pressure treatment, where a stronger/higher strength glass surface that is harder to scratch is thereby produced.

An exemplary embodiment of the physical tempering method includes but is not limited to applying a coating to or changing the structure of an object such as to strengthen the easily broken position. The applied coating can be, for example, a ceramic coating, an acrylic coating, or a glass coating depending on the material used. The coating can be performed in a liquid phase or gaseous phase.

The above glass tempering methods described including physical tempering methods and chemical tempering methods can be accomplished singly or combined together in any fashion.

Figure 15:
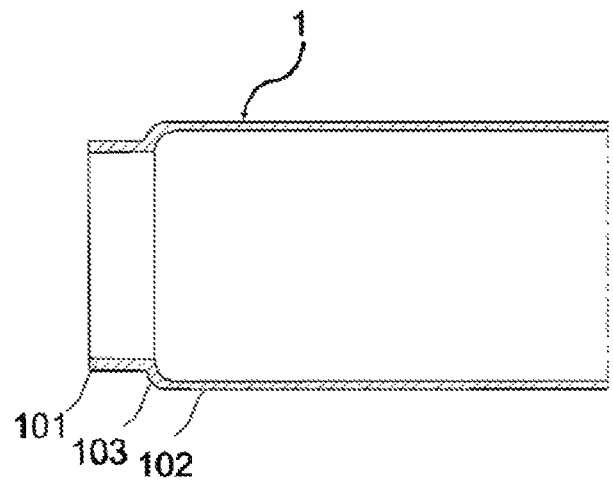
FIG. 15 is a plane cross-sectional view schematically illustrating end structure of a lamp tube of the LED tube lamp according to one embodiment of the present invention.

Referring to FIG. 2 and FIG. 15, a glass made lamp tube of an LED tube lamp according to one embodiment of the present invention has structure-strengthened end regions described as follows. The glass made lamp tube 1 includes a main body region 102, two rear end regions 101 (or just end regions 101) respectively formed at two ends of the main body region 102, and end caps 3 that respectively sleeve the rear end regions 101. The outer diameter of at least one of the rear end regions 101 is less than the outer diameter of the main body region 102. In the embodiment of FIGS. 2 and 15, the outer diameters of the two rear end regions 101 are less than the outer diameter of the main body region 102. In addition, the surface of the rear end region 101 is in parallel with the surface of the main body region 102 in a cross-sectional view. Specifically, the glass made lamp tube 1 is strengthened at both ends, such that the rear end regions 101 are formed to be strengthened structures. In certain embodiments, the rear end regions 101 with strengthened structure are respectively sleeved with the end caps 3, and the outer diameters of the end caps 3 and the main body region 102 have little or no differences. For example, the end caps 3 may have the same or substantially the same outer diameters as that of the main body region 102 such that there is no gap between the end caps 3 and the main body region 102. In this way, a supporting seat in a packing box for transportation of the LED tube lamp contacts not only the end caps 3 but also the lamp tube 1 and makes uniform the loadings on the entire LED tube lamp to avoid situations where only the end caps 3 are forced, therefore preventing breakage at the connecting portion between the end caps 3 and the rear end regions 101 due to stress concentration. The quality and the appearance of the product are therefore improved.

In one embodiment, the end caps 3 and the main body region 102 have substantially the same outer diameters. These diameters may have a tolerance for example within +/−0.2 millimeter (mm), or in some cases up to +/−1.0 millimeter (mm). Depending on the thickness of the end caps 3, the difference between an outer diameter of the rear end regions 101 and an outer diameter of the main body region 102 can be about 1 mm to about 10 mm for typical product applications. In some embodiments, the difference between the outer diameter of the rear end regions 101 and the outer diameter of the main body region 102 can be about 2 mm to about 7 mm.

Referring to FIG. 15, the lamp tube 1 is further formed with a transition region 103 between the main body region 102 and the rear end regions 101. In one embodiment, the transition region 103 is a curved region formed to have cambers at two ends to smoothly connect the main body region 102 and the rear end regions 101, respectively. For example, the two ends of the transition region 103 may be arc-shaped in a cross-section view along the axial direction of the lamp tube 1. Furthermore, one of the cambers connects the main body region 102 while the other one of the cambers connects the rear end region 101. In some embodiments, the arc angle of the cambers is greater than 90 degrees while the outer surface of the rear end region 101 is a continuous surface in parallel with the outer surface of the main body region 102 when viewed from the cross-section along the axial direction of the lamp tube. In other embodiments, the transition region 103 can be without curve or arc in shape. In certain embodiments, the length of the transition region 103 along the axial direction of the lamp tube 1 is between about 1 mm to about 4 mm. Upon experimentation, it was found that when the length of the transition region 103 along the axial direction of the lamp tube 1 is less than 1 mm, the strength of the transition region would be insufficient; when the length of the transition region 103 along the axial direction of the lamp tube 1 is more than 4 mm, the main body region 102 would be shorter and the desired illumination surface would be reduced, and the end caps 3 would be longer and the more materials for the end caps 3 would be needed.

Figure 5:
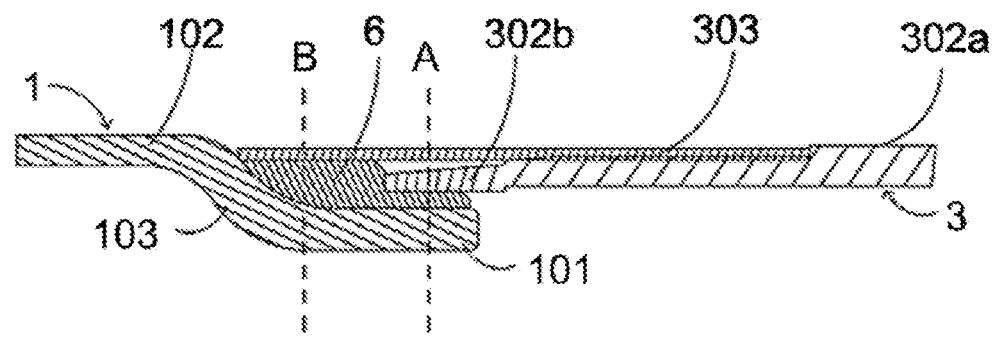
FIG. 5 is a plane cross-sectional partial view schematically illustrating a connecting region of the end cap and the lamp tube of the LED tube lamp according to one embodiment of the present invention.
Figure 16:
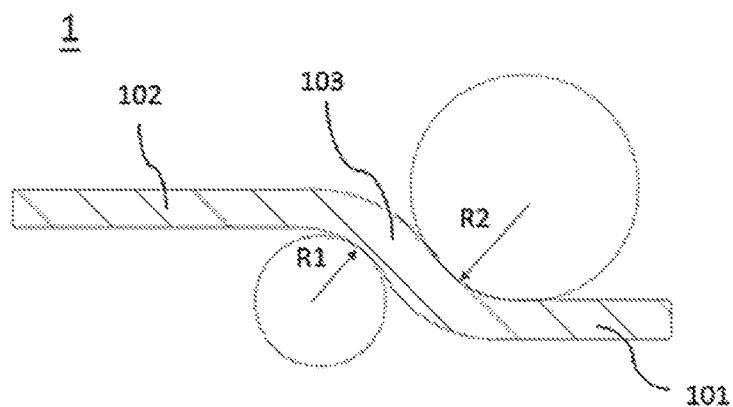
FIG. 16 is an exemplary plane cross-sectional view schematically illustrating the local structure of the transition region of the end of the lamp tube of FIG. 15.

Referring to FIG. 5 and FIG. 16, in certain embodiments, the lamp tube 1 is made of glass, and has a rear end region 101, a main body region 102, and a transition region 103. The transition region 103 has two arc-shaped cambers at both ends to from an S shape; one camber positioned near the main body region 102 is convex outwardly, while the other camber positioned near the rear end region 101 is concaved inwardly. Generally speaking, the radius of curvature, R1, of the camber/arc between the transition region 103 and the main body region 102 is smaller than the radius of curvature, R2, of the camber/arc between the transition region 103 and the rear end region 101. The ratio R1:R2 may range, for example, from about 1:1.5 to about 1:10, and in some embodiments is more effective from about 1:2.5 to about 1:5, and in some embodiments is even more effective from about 1:3 to about 1:4. In this way, the camber/arc of the transition region 103 positioned near the rear end region 101 is in compression at outer surfaces and in tension at inner surfaces, and the camber/arc of the transition region 103 positioned near the main body region 102 is in tension at outer surfaces and in compression at inner surfaces. Therefore, the goal of strengthening the transition region 103 of the lamp tube 1 is achieved.

Taking the standard specification for T8 lamp as an example, the outer diameter of the rear end region 101 is configured between 20.9 mm to 23 mm. An outer diameter of the rear end region 101 being less than 20.9 mm would be too small to fittingly insert the power supply into the lamp tube 1. The outer diameter of the main body region 102 is in some embodiments configured to be between about 25 mm to about 28 mm. An outer diameter of the main body region 102 being less than 25 mm would be inconvenient to strengthen the ends of the main body region 102 as far as the current manufacturing skills are concerned, while an outer diameter of the main body region 102 being greater than 28 mm is not compliant to the industrial standard.

Figure 3:
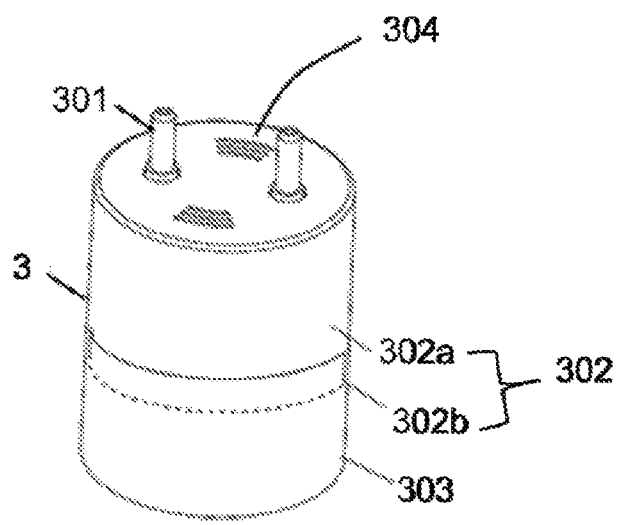
FIG. 3 is a perspective view schematically illustrating front and top of an end cap of the LED tube lamp according to one embodiment of the present invention.
Figure 4:
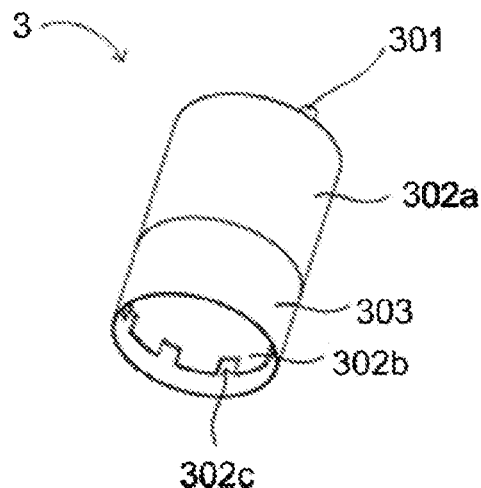
FIG. 4 is an exemplary perspective view schematically illustrating bottom of the end cap as shown in FIG. 3.

Referring to FIGS. 3 and 4, in one embodiment of the invention, each end cap 3 includes an electrically insulating tube 302, a thermal conductive member 303 sleeving over the electrically insulating tube 302, and two hollow conductive pins 301 disposed on the electrically insulating tube 302. The thermal conductive member 303 can be a metal ring that is tubular in shape.

Referring FIG. 5, in one embodiment, one end of the thermal conductive member 303 extends away from the electrically insulating tube 302 of the end cap 3 and towards one end of the lamp tube 1, and is bonded and adhered to the end of the lamp tube 1 using a hot melt adhesive 6. In this way, the end cap 3 by way of the thermal conductive member 303 extends to the transition region 103 of the lamp tube 1. In one embodiment, the thermal conductive member 303 and the transition region 103 are closely connected such that the hot melt adhesive 6 would not overflow out of the end cap 3 and remain on the main body region 102 when using the hot melt adhesive 6 to join the thermal conductive member 303 and the lamp tube 1. In addition, the electrically insulating tube 302 facing toward the lamp tube 1 does not have an end extending to the transition region 103, and that there is a gap between the electrically insulating tube 302 and the transition region 103. In one embodiment, the electrically insulating tube 302 is not limited to being made of plastic or ceramic, any material that is not a good electrical conductor can be used.

The hot melt adhesive 6 is a composite including a so-called commonly known as "welding mud powder", and in some embodiments includes one or more of phenolic resin 2127#, shellac, rosin, calcium carbonate powder, zinc oxide, and ethanol. Rosin is a thickening agent with a feature of being dissolved in ethanol but not dissolved in water. In one embodiment, a hot melt adhesive 6 having rosin could be expanded to change its physical status to become solidified when being heated to high temperature in addition to the intrinsic viscosity. Therefore, the end cap 3 and the lamp tube 1 can be adhered closely by using the hot melt adhesive to accomplish automatic manufacture for the LED tube lamps. In one embodiment, the hot melt adhesive 6 may be expansive and flowing and finally solidified after cooling. In this embodiment, the volume of the hot melt adhesive 6 expands to about 1.3 times the original size when heated from room temperature to about 200 to 250 degrees Celsius. The hot melt adhesive 6 is not limited to the materials recited herein. Alternatively, a material for the hot melt adhesive 6 to be solidified immediately when heated to a predetermined temperature can be used. The hot melt adhesive 6 provided in each embodiments of the present invention is durable with respect to high temperature inside the end caps 3 due to the heat resulted from the power supply. Therefore, the lamp tube 1 and the end caps 3 could be secured to each other without decreasing the reliability of the LED tube lamp.

Furthermore, there is formed an accommodation space between the inner surface of the thermal conductive member 303 and the outer surface of the lamp tube 1 to accommodate the hot melt adhesive 6, as indicated by the dotted line B in FIG. 5. For example, the hot melt adhesive 6 can be filled into the accommodation space at a location where a first hypothetical plane (as indicated by the dotted line B in FIG. 5) being perpendicular to the axial direction of the lamp tube 1 would pass through the thermal conductive member, the hot melt adhesive 6, and the outer surface of the lamp tube 1. The hot melt adhesive 6 may have a thickness, for example, of about 0.2 mm to about 0.5 mm. In one embodiment, the hot melt adhesive 6 will be expansive to solidify in and connect with the lamp tube 1 and the end cap 3 to secure both. The transition region 103 brings a height difference between the rear end region 101 and the main body region 102 to avoid the hot melt adhesives 6 being overflowed onto the main body region 102, and thereby saves manpower to remove the overflowed adhesive and increase the LED tube lamp productivity. The hot melt adhesive 6 is heated by receiving heat from the thermal conductive member 303 to which an electricity from an external heating equipment is applied, and then expands and finally solidifies after cooling, such that the end caps 3 are adhered to the lamp tube 1.

Referring to FIG. 5, in one embodiment, the electrically insulating tube 302 of the end cap 3 includes a first tubular part 302a and a second tubular part 302b connected along an axial direction of the lamp tube 1. The outer diameter of the second tubular part 302b is less than the outer diameter of the first tubular part 302a. In some embodiments, the outer diameter difference between the first tubular part 302a and the second tubular part 302b is between about 0.15 mm and about 0.30 mm. The thermal conductive member 303 sleeves over the outer circumferential surface of the second tubular part 302b. The outer surface of the thermal conductive member 303 is coplanar or substantially flush with respect to the outer circumferential surface of the first tubular part 302a. For example, the thermal conductive member 303 and the first tubular part 302a have substantially uniform exterior diameters from end to end. As a result, the entire end cap 3 and thus the entire LED tube lamp may be smooth with respect to the outer appearance and may have a substantially uniform tubular outer surface, such that the loading during transportation on the entire LED tube lamp is also uniform. In one embodiment, a ratio of the length of the thermal conductive member 303 along the axial direction of the end cap 3 to the axial length of the electrically insulating tube 302 ranges from about 1:2.5 to about 1:5.

In one embodiment, for sake of secure adhesion between the end cap 3 and the lamp tube 1, the second tubular part 302b is at least partially disposed around the lamp tube 1, and the accommodation space further includes a space encompassed by the inner surface of the second tubular part 302b and the outer surface of the rear end region 101 of the lamp tube 1. The hot melt adhesive 6 is at least partially filled in an overlapped region (shown by a dotted line "A" in FIG. 5) between the inner surface of the second tubular part 302b and the outer surface of the rear end region 101 of the lamp tube 1. For example, the hot melt adhesive 6 may be filled into the accommodation space at a location where a second hypothetical plane (shown by the dotted line A in FIG. 5) being perpendicular to the axial direction of the lamp tube 1 would pass through the thermal conductive member 303, the second tubular part 302b, the hot melt adhesive 6, and the rear end region 101.

The hot melt adhesive 6 is not required to completely fill the entire accommodation space as shown in FIG. 5, especially where a gap is reserved or formed between the thermal conductive member 303 and the second tubular part 302b. For example, in some embodiments, the hot melt adhesive 6 can be only partially filled into the accommodation space. During manufacturing of the LED tube lamp, the amount of the hot melt adhesive 6 coated and applied between the thermal conductive member 303 and the rear end region 101 may be appropriately increased, such that in the subsequent heating process, the hot melt adhesive 6 can be caused to expand and flow in between the second tubular part 302b and the rear end region 101, and thereby solidify after cooling to join the second tubular part 302b and the rear end region 101.

During fabrication of the LED tube lamp, the rear end region 101 of the lamp tube 1 is inserted into one of the end caps 3. In some embodiments, the axial length of the inserted portion of the rear end region 101 of the lamp tube 1 accounts for approximately one-third (⅓) to two-thirds (⅔) of the total axial length of the thermal conductive member 303. One benefit is that, there will be sufficient creepage distance between the hollow conductive pins 301 and the thermal conductive member 303, and thus it is not easy to form a short circuit leading to dangerous electric shock to individuals. On the other hand, the creepage distance between the hollow conductive pin 301 and the thermal conductive member 303 is increased due to the electrically insulating effect of the electrically insulating tube 302, and thus a high voltage test is more likely to pass without causing electrical shocks to people.

Furthermore, the presence of the second tubular part 302b interposed between the hot melt adhesive 6 and the thermal conductive member 303 may reduce the heat from the thermal conductive member 303 to the hot melt adhesive 6. To help prevent or minimize this problem, referring to FIG. 4 in one embodiment, the end of the second tubular part 302b facing the lamp tube 1 (i.e., away from the first tubular part 302a) is circumferentially provided with a plurality of notches 302c. These notches 302c help to increase the contact areas between the thermal conductive member 303 and the hot melt adhesive 6 and therefore provide rapid heat conduction from the thermal conductive member 303 to the hot melt adhesive 6 so as to accelerate the solidification of the hot melt adhesive 6. Moreover, the hot melt adhesive 6 electrically insulates the thermal conductive member 303 and the lamp tube 1 so that a user would not be electrically shocked when he touches the thermal conductive member 303 connected to a broken lamp tube 1.

The thermal conductive member 303 can be made of various heat conducting materials. The thermal conductive member 303 can be a metal sheet such as an aluminum alloy. The thermal conductive member 303 sleeves the second tubular part 302b and can be tubular or ring-shaped. The electrically insulating tube 302 may be made of electrically insulating material, but in some embodiments have low thermal conductivity so as to prevent the heat from reaching the power supply module located inside the end cap 3 and therefore negatively affecting performance of the power supply module. In one embodiment, the electrically insulating tube 302 is a plastic tube.

Alternatively, the thermal conductive member 303 may be formed by a plurality of metal plates circumferentially arranged on the tubular part 302b with either an equidistant space or a non-equidistant space.

The end cap 3 may be designed to have other kinds of structures or include other elements. Referring to FIG. 6, the end cap 3 according to another embodiment further includes a magnetic metal member 9 within the electrically insulating tube 302 but excludes the thermal conductive member 3. The magnetic metal member 9 is fixedly arranged on the inner circumferential surface of the electrically insulating tube 302 and therefore interposed between the electrically insulating tube 302 and the lamp tube 1 such that the magnetic metal member 9 is partially overlapped with the lamp tube 1 in the radial direction. In this embodiment, the whole magnetic metal member 9 is inside the electrically insulating tube 302, and the hot melt adhesive 6 is coated on the inner surface of the magnetic metal member 9 (the surface of the magnetic metal tube member 9 facing the lamp tube 1) and adhered to the outer peripheral surface of the lamp tube 1. In some embodiments, the hot melt adhesive 6 covers the entire inner surface of the magnetic metal member 9 in order to increase the adhesion area and to improve the stability of the adhesion.

Referring to FIG. 7, when manufacturing the LED tube lamp of this embodiment, the electrically insulating tube 302 is inserted in an external heating equipment which is in some embodiments an induction coil 11, so that the induction coil 11 and the magnetic metal member 9 are disposed opposite (or adjacent) to one another along the radially extending direction of the electrically insulating tube 302. The induction coil 11 is energized and forms an electromagnetic field, and the electromagnetic field induces the magnetic metal member 9 to create an electrical current and become heated. The heat from the magnetic metal member 9 is transferred to the hot melt adhesive 6 to make the hot melt adhesive 6 expansive and flowing and then solidified after cooling, and the bonding for the end cap 3 and the lamp tube 1 can be accomplished. The induction coil 11 may be made, for example, of red copper and composed of metal wires having width of, for example, about 5 mm to about 6 mm to be a circular coil with a diameter, for example, of about 30 mm to about 35 mm, which is a bit greater than the outer diameter of the end cap 3. Since the end cap 3 and the lamp tube 1 may have the same outer diameters, the outer diameter may change depending on the outer diameter of the lamp tube 1, and therefore the diameter of the induction coil 11 used can be changed depending on the type of the lamp tube 1 used. As examples, the outer diameters of the lamp tube for T12, T10, T8, T5, T4, and T2 are 38.1 mm, 31.8 mm, 25.4 mm, 16 mm, 12.7 mm, and 6.4 mm, respectively.

Furthermore, the induction coil 11 may be provided with a power amplifying unit to increase the alternating current power to about 1 to 2 times the original. In some embodiments, it is better that the induction coil 11 and the electrically insulating tube 302 are coaxially aligned to make energy transfer more uniform. In some embodiments, a deviation value between the axes of the induction coil 11 and the electrically insulating tube 302 is not greater than about 0.05 mm. When the bonding process is complete, the end cap 3 and the lamp tube 1 are moved away from the induction coil. Then, the hot melt adhesive 6 absorbs the energy to be expansive and flowing and solidified after cooling. In one embodiment, the magnetic metal member 9 can be heated to a temperature of about 250 to about 300 degrees Celsius; the hot melt adhesive 6 can be heated to a temperature of about 200 to about 250 degrees Celsius. The material of the hot melt adhesive is not limited here, and a material of allowing the hot melt adhesive to immediately solidify when absorb heat energy can also be used.

In one embodiment, the induction coil 11 may be fixed in position to allow the end cap 3 and the lamp tube 1 to be moved into the induction coil 11 such that the hot melt adhesive 6 is heated to expand and flow and then solidify after cooling when the end cap 3 is again moved away from the induction coil 11. Alternatively, the end cap 3 and the lamp tube 1 may be fixed in position to allow the induction coil 11 to be moved to encompass the end cap 3 such that the hot melt adhesive 6 is heated to expand and flow and then solidify after cooling when the induction coil 11 is again moved away from the end cap 3. In one embodiment, the external heating equipment for heating the magnetic metal member 9 is provided with a plurality of devices the same as the induction coils 11, and the external heating equipment moves relative to the end cap 3 and the lamp tube 1 during the heating process. In this way, the external heating equipment moves away from the end cap 3 when the heating process is completed. However, the length of the lamp tube 1 is far greater than the length of the end cap 3 and may be up to above 240 cm in some special appliances, and this may cause bad connection between the end cap 3 and the lamp tube 1 during the process that the lamp tube 1 accompany with the end cap 3 to relatively enter or leave the induction coil 11 in the back and for the direction as mentioned above when a position error exists.

Figure 44:
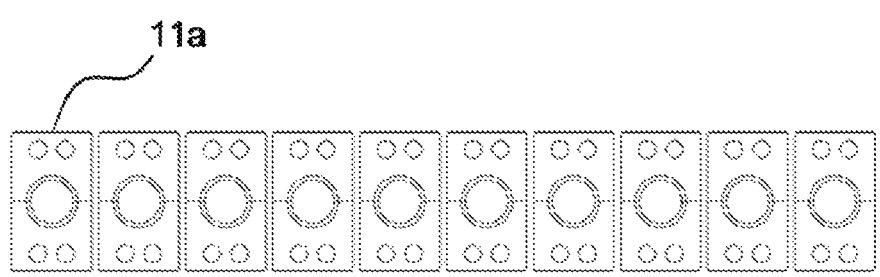
FIG. 44 is a plan view schematically illustrating an external equipment for heating the hot melt adhesive according to another embodiment of the present invention.

Referring to FIG. 44, an external heating equipment 110 having a plurality sets of upper and lower semicircular fixtures 11a is provided to achieve same heating effect as that brought by the induction coils 11. In this way, the above-mentioned damage risk due to the relative movement in back-and-forth direction can be reduced. The upper and lower semicircular fixtures 11a each has a semicircular coil made by winding a metal wire of, for example, about 5 mm to about 6 mm wide. The combination of the upper and lower semicircular fixtures form a ring with a diameter, for example, of about 30 mm to about 35 mm, and the inside semicircular coils form a closed loop to become the induction coil 11 as mentioned. In this embodiment, the end cap 3 and the lamp tube 1 do not relatively move in the back-and-forth manner, but roll into the notch of the lower semicircular fixture. Specifically, an end cap 3 accompanied with a lamp tube 1 initially roll on a production line, and then the end cap 3 rolls into the notch of a lower semicircular fixture, and then the upper and the lower semicircular fixtures are combined to form a closed loop, and the fixtures are detached when heating is completed. This method reduces the need for high position precision and yield problems in production.

Referring to FIG. 6, the electrically insulating tube 302 is further divided into two parts, namely a first tubular part 302d and a second tubular part 302e, i.e. the remaining part. In order to provide better support of the magnetic metal member 9, an inner diameter of the first tubular part 302d for supporting the magnetic metal member 9 is larger than the inner diameter of the second tubular part 302e which does not have the magnetic metal member 9, and a stepped structure is formed at the connection of the first tubular part 302d and the second tubular part 302e. In this way, an end of the magnetic metal member 9 as viewed in an axial direction is abutted against the stepped structure such that the entire inner surface of the end cap is smooth and plain. Additionally, the magnetic metal member 9 may be of various shapes, e.g., a sheet-like or tubular-like structure being circumferentially arranged or the like, where the magnetic metal member 9 is coaxially arranged with the electrically insulating tube 302.

Referring to FIGS. 8 and 9, the electrically insulating tube may be further formed with a supporting portion 313 on the inner surface of the electrically insulating tube 302 to be extending inwardly such that the magnetic metal member 9 is axially abutted against the upper edge of the supporting portion 313. In some embodiments, the thickness of the supporting portion 313 along the radial direction of the electrically insulating tube 302 is between 1 mm to 2 mm. The electrically insulating tube 302 may be further formed with a protruding portion 310 on the inner surface of the electrically insulating tube 302 to be extending inwardly such that the magnetic metal member 9 is radially abutted against the side edge of the protruding portion 310 and that the outer surface of the magnetic metal member 9 and the inner surface of the electrically insulating tube 302 is spaced apart with a gap. The thickness of the protruding portion 310 along the radial direction of the electrically insulating tube 302 is less than the thickness of the supporting portion 313 along the radial direction of the electrically insulating tube 302 and in some embodiments be 0.2 mm to 1 mm in an embodiment.

Referring to FIG. 9, the protruding portion 310 and the supporting portion are connected along the axial direction, and the magnetic metal member 9 is axially abutted against the upper edge of the supporting portion 313 while radially abutted against the side edge of the protruding portion 310 such that at least part of the protruding portion 310 intervenes between the magnetic metal member 9 and the electrically insulating tube 302. The protruding portion 310 may be arranged along the circumferential direction of the electrically insulating tube 302 to have a circular configuration. Alternatively, the protruding portion 310 may be in the form of a plurality of bumps arranged on the inner surface of the electrically insulating tube 302. The bumps may be equidistantly or non-equidistantly arranged along the inner circumferential surface of the electrically insulating tube 302 as long as the outer surface of the magnetic metal member 9 and the inner surface of the electrically insulating tube 302 are in a minimum contact and simultaneously hold the hot melt adhesive 6. In other embodiments, an entirely metal made end cap 3 could be used with an insulator disposed under the hollow conductive pin to endure the high voltage.

Referring to FIG. 10, in one embodiment, the magnetic metal member 9 can have one or more openings 91 that are circular. However, the openings 91 may instead be, for example, oval, square, star shaped, etc., as long as the contact area between the magnetic metal member 9 and the inner peripheral surface of the electrically insulating tube 302 can be reduced and the function of the magnetic metal member 9 to heat the hot melt adhesive 6 can be performed. In some embodiments, the openings 91 occupy about 10% to about 50% of the surface area of the magnetic metal member 9. The opening 91 can be arranged circumferentially on the magnetic metal member 9 in an equidistantly spaced or non-equidistantly spaced manner.

Referring to FIG. 11, in other embodiments, the magnetic metal member 9 has an indentation/embossment 93 on surface facing the electrically insulating tube 302. The embossment is raised from the inner surface of the magnetic metal member 9, while the indentation is depressed under the inner surface of the magnetic metal member 9. The indentation/embossment reduces the contact area between the inner peripheral surface of the electrically insulating tube 302 and the outer surface of the magnetic metal member 9 while maintaining the function of melting and curing the hot melt adhesive 6. In sum, the surface of the magnetic metal member 9 can be configured to have openings, indentations, or embossments or any combination thereof to achieve the goal of reducing the contact area between the inner peripheral surface of the electrically insulating tube 302 and the outer surface of the magnetic metal member 9. At the same time, the firm adhesion between the magnetic metal member 9 and the lamp tube 1 should be secured to accomplish the heating and solidification of the hot melt adhesive 6.

Referring to FIG. 12, in one embodiment, the magnetic metal member 9 is a circular ring. Referring to FIG. 13, in another embodiment, the magnetic metal member 9 is a non-circular ring such as but not limited to an oval ring. When the magnetic metal member 9 is an oval ring, the minor axis of the oval ring is slightly larger than the outer diameter of the end region of the lamp tube 1 such that the contact area of the inner peripheral surface of the electrically insulating tube 302 and the outer surface of the magnetic metal member 9 is reduced and the function of melting and curing the hot melt adhesive 6 still performs properly. For example, the inner surface of the electrically insulating tube 302 may be formed with supporting portion 313 and the magnetic metal member 9 in a non-circular ring shape is seated on the supporting portion 313. Thus, the contact area of the outer surface of the magnetic metal member 9 and the inner surface of the electrically insulating tube 302 could be reduced while that the function of solidifying the hot melt adhesive 6 could be performed. In other embodiments, the magnetic metal member 9 can be disposed on the outer surface of the end cap 3 to replace the thermal conductive member 303 as shown in FIG. 5 and to perform the function of heating and solidifying the hot melt adhesive 6 via electromagnetic induction.

Figure 45:
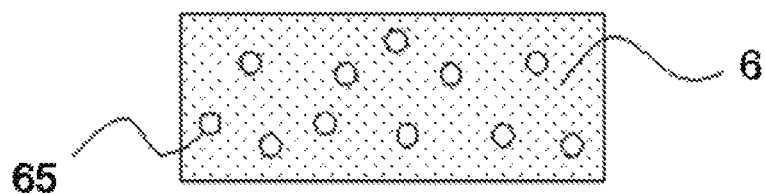
FIG. 45 is a cross-sectional view schematically illustrating the hot melt adhesive having uniformly distributed high permeability powder particles with small particle size according to one embodiment of the present invention.
Figure 46:
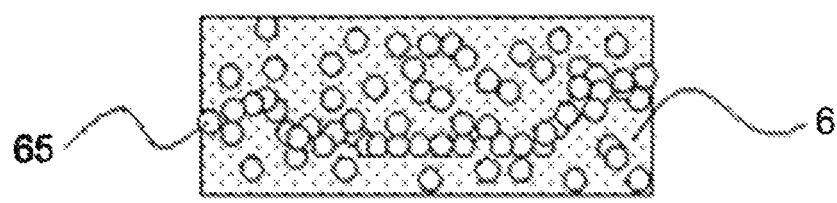
FIG. 46 is a cross-sectional view schematically illustrating the hot melt adhesive having non-uniformly distributed high permeability powder particles with small particle size according to another embodiment of the present invention, wherein the powder particles form a closed electric loop.
Figure 47:
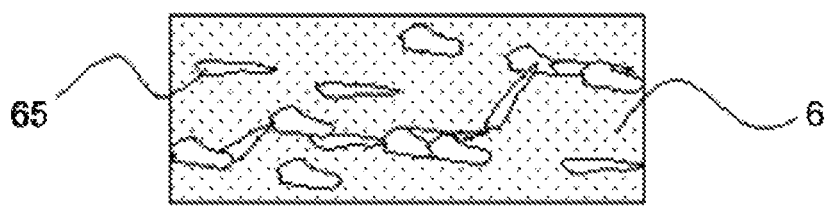
FIG. 47 is a cross-sectional view schematically illustrating the hot melt adhesive having non-uniformly distributed high permeability powder particles with large particle size according to yet another embodiment of the present invention, wherein the powder particles form a closed electric loop.

Referring to FIGS. 45 to 47, in other embodiments, the magnetic metal member 9 may be omitted. Instead, in some embodiments, the hot melt adhesive 6 has a predetermined proportion of high permeability powders 65 having relative permeability ranging, for example, from about $10^2$ to about $10^6$. The powders can be used to replace the calcite powders originally included in the hot melt adhesive 6, and in certain embodiments, a volume ratio of the high permeability powders 65 to the calcite powders may be about 1:3~1:1. In some embodiments, the material of the high permeability powders 65 is one of iron, nickel, cobalt, alloy thereof, or any combination thereof; the weight percentage of the high permeability powders 65 with respect to the hot melt adhesive is about 10% to about 50%; and/or the powders may have mean particle size of about 1 to about 30 micrometers. Such a hot melt adhesive 6 allows the end cap 3 and the lamp tube 1 to adhere together and be qualified in a destruction test, a torque test, and a bending test. Generally speaking, the bending test standard for the end cap of the LED tube lamp is greater than 5 newton-meters (Nt-m), while the torque test standard is greater than 1.5 newton-meters (Nt-m). In one embodiment, upon the ratio of the high permeability powders 65 to the hot melt adhesive 6 and the magnetic flux applied, the end cap 3 and the end of the lamp tube 1 secured by using the hot melt adhesive 6 are qualified in a torque test of 1.5 to 5 newton-meters (Nt-m) and a bending test of 5 to 10 newton-meters (Nt-m). The induction coil 11 is first switched on and allow the high permeability powders uniformly distributed in the hot melt adhesive 6 to be charged, and therefore allow the hot melt adhesive 6 to be heated to be expansive and flowing and then solidified after cooling. Thereby, the goal of adhering the end cap 3 onto the lamp tube 1 is achieved.

Referring to FIGS. 45 to 47, the high permeability powders 65 may have different distribution manners in the hot melt adhesive 6. As shown in FIG. 45, the high permeability powders 65 have mean particle size of about 1 to about 5 micrometers, and are distributed uniformly in the hot melt adhesive 6. When such a hot melt adhesive 6 is coated on the inner surface of the end cap 3, though the high permeability powders 65 cannot form a closed loop due to the uniform distribution, they can still be heated due to magnetic hysteresis in the electromagnetic field, so as to heat the hot melt adhesive 6. As shown in FIG. 46, the high permeability powders 65 have mean particle size of about 1 to about 5 micrometers, and are distributed randomly in the hot melt adhesive 6. When such a hot melt adhesive 6 is coated on the inner surface of the end cap 3, the high permeability powders 65 form a closed loop due to the random distribution; they can be heated due to magnetic hysteresis or the closed loop in the electromagnetic field, so as to heat the hot melt adhesive 6. As shown in FIG. 47, the high permeability powders 65 have mean particle size of about 5 to about 30 micrometers, and are distributed randomly in the hot melt adhesive 6. When such a hot melt adhesive 6 is coated on the inner surface of the end cap 3, the high permeability powders 65 form a closed loop due to the random distribution; they can be heated due to magnetic hysteresis or the closed loop in the electromagnetic field, so as to heat the hot melt adhesive 6. Accordingly, depending on the adjustment of the particle size, the distribution density and the distribution manner of the high permeability powders 65, and the electromagnetic flux applied to the end cap 3, the heating temperature of the hot melt adhesive 6 can be controlled. In one embodiment, the hot melt adhesive 6 is flowing and solidified after cooling from a temperature of about 200 to about 250 degrees Celsius. In another embodiment, the hot melt adhesive 6 is immediately solidified at a temperature of about 200 to about 250 degrees Celsius.

Figure 14:
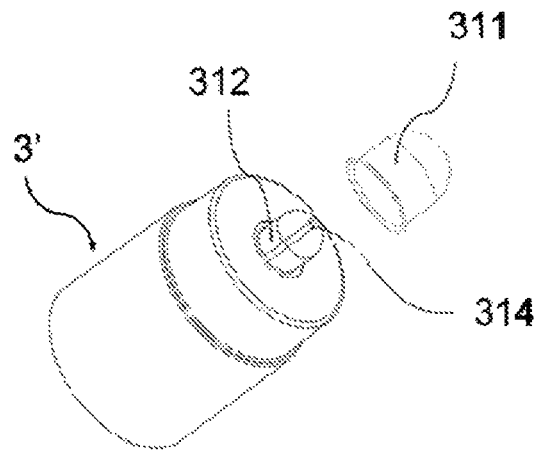
FIG. 14 is a perspective view schematically illustrating still another end cap of an LED tube lamp according to still another embodiment of the prevent invention.
Figure 39:
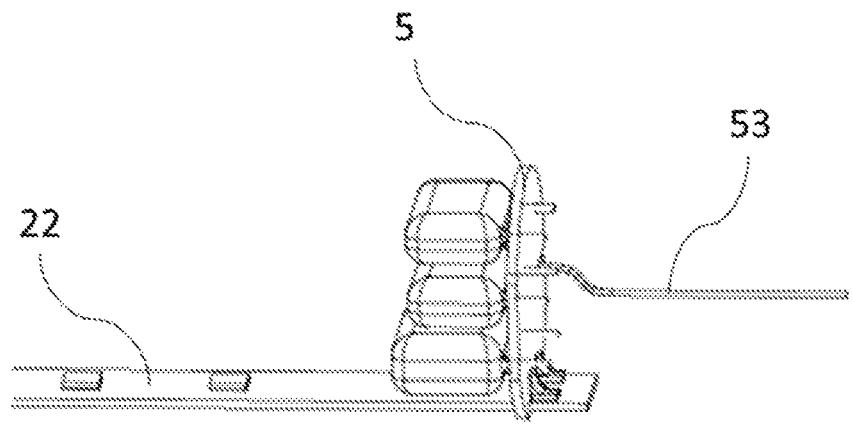
FIG. 39 is a perspective view schematically illustrating the printed circuit board of the power supply, which is perpendicularly adhered to a hard circuit board made of aluminum via soldering according to another embodiment of the present invention.

Referring to FIGS. 14 and 39, in one embodiment, an end cap 3' has a pillar 312 at one end, the top end of the pillar 312 is provided with an opening having a groove 314 of, for example 0.1±1% mm depth at the periphery thereof for positioning a conductive lead 53 as shown in FIG. 39. The conductive lead 53 passes through the opening on top of the pillar 312 and has its end bent to be disposed in the groove 314. After that, a conductive metallic cap 311 covers the pillar 312 such that the conductive lead 53 is fixed between the pillar 312 and the conductive metallic cap 311. In some embodiments, the inner diameter of the conductive metallic cap 311 is 7.56±5% mm, the outer diameter of the pillar 312 is 7.23±5% mm, and the outer diameter of the conductive lead 53 is 0.5±1% mm. Nevertheless, the mentioned sizes are not limited here once that the conductive metallic cap 311 closely covers the pillar 312 without using extra adhesives and therefore completes the electrical connection between the power supply 5 and the conductive metallic cap 311.

Referring to FIGS. 2, 3, 12, and 13, in one embodiment, the end cap 3 may have openings 304 to dissipate heat generated by the power supply modules inside the end cap 3 so as to prevent a high temperature condition inside the end cap 3 that might reduce reliability. In some embodiments, the openings are in a shape of an arc; especially in a shape of three arcs with different size. In one embodiment, the openings are in a shape of three arcs with gradually varying size. The openings on the end cap 3 can be in any one of the above-mentioned shape or any combination thereof.

In other embodiments, the end cap 3 is provided with a socket (not shown) for installing the power supply module.

Figures 17, 18:
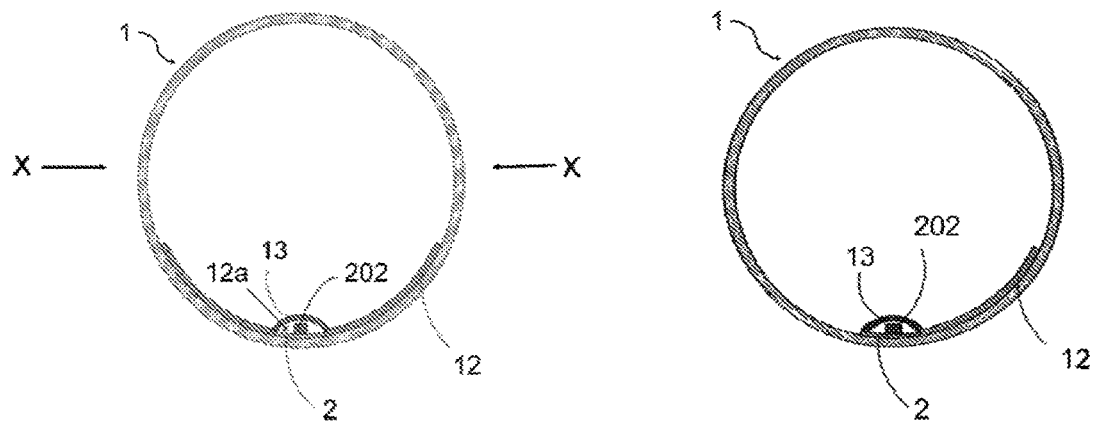
FIG. 17 is a plane cross-sectional view schematically illustrating inside structure of the lamp tube of the LED tube lamp according to one embodiment of the present invention, wherein two reflective films are respectively adjacent to two sides of the LED light strip along the circumferential direction of the lamp tube.
FIG. 18 is a plane cross-sectional view schematically illustrating inside structure of the lamp tube of the LED tube lamp according to another embodiment of the present invention, wherein only a reflective film is disposed on one side of the LED light strip along the circumferential direction of the lamp tube.

Referring to FIG. 17, in one embodiment, the lamp tube 1 further has a diffusion film 13 coated and bonded to the inner surface thereof so that the light outputted or emitted from the LED light sources 202 is diffused by the diffusion film 13 and then pass through the lamp tube 1. The diffusion film 13 can be in form of various types, such as a coating onto the inner surface or outer wall of the lamp tube 1, or a diffusion coating layer (not shown) coated at the surface of each LED light source 202, or a separate membrane covering the LED light source 202.

Referring again to FIG. 17, in one embodiment, when the diffusion film 13 is in the form of a sheet, it covers but is not in contact with the LED light sources 202. The diffusion film 13 in the form of a sheet is usually called an optical diffusion sheet or board, usually a composite made of mixing diffusion particles into polystyrene (PS), polymethyl methacrylate (PMMA), polyethylene terephthalate (PET), and/or polycarbonate (PC), and/or any combination thereof. The light passing through such composite is diffused to expand in a wide range of space such as a light emitted from a plane source, and therefore makes the brightness of the LED tube lamp uniform.

In alternative embodiments, the diffusion film 13 is in form of an optical diffusion coating, which is composed of any one of calcium carbonate, halogen calcium phosphate and aluminum oxide, or any combination thereof. When the optical diffusion coating is made from a calcium carbonate with suitable solution, an excellent light diffusion effect and transmittance to exceed 90% can be obtained. Furthermore, the diffusion film 13 in form of an optical diffusion coating may be applied to an outer surface of the rear end region 101 having the hot melt adhesive 6 to produce increased friction resistance between the end cap 3 and the rear end region 101. Compared with an example without any optical diffusion coating, the rear end region 101 having the diffusion film 13 is beneficial, for example for preventing accidental detachment of the end cap 3 from the lamp tube 1.

In one embodiment, the composition of the diffusion film 13 in form of the optical diffusion coating includes calcium carbonate, strontium phosphate (e.g., CMS-5000, white powder), thickener, and a ceramic activated carbon (e.g., ceramic activated carbon SW—C, which is a colorless liquid). Specifically, in one example, such an optical diffusion coating on the inner circumferential surface of the glass tube has an average thickness ranging between about 20 and about 30 μm. A light transmittance of the diffusion film 13 using this optical diffusion coating is about 90%. Generally speaking, the light transmittance of the diffusion film 13 ranges from 85% to 96%. In addition, this diffusion film 13 can also provide electrical isolation for reducing risk of electric shock to a user upon breakage of the lamp tube 1. Furthermore, the diffusion film 13 provides an improved illumination distribution uniformity of the light outputted by the LED light sources 202 such that the light can illuminate the back of the light sources 202 and the side edges of the bendable circuit sheet so as to avoid the formation of dark regions inside the lamp tube 1 and improve the illumination comfort. In another possible embodiment, the light transmittance of the diffusion film can be 92% to 94% while the thickness ranges from about 200 to about 300 μm.

In another embodiment, the optical diffusion coating can also be made of a mixture including a calcium carbonate-based substance, some reflective substances like strontium phosphate or barium sulfate, a thickening agent, ceramic activated carbon, and deionized water. The mixture is coated on the inner circumferential surface of the glass tube and has an average thickness ranging between about 20 and about 30 μm. In view of the diffusion phenomena in microscopic terms, light is reflected by particles. The particle size of the reflective substance such as strontium phosphate or barium sulfate will be much larger than the particle size of the calcium carbonate. Therefore, adding a small amount of reflective substance in the optical diffusion coating can effectively increase the diffusion effect of light.

In other embodiments, halogen calcium phosphate or aluminum oxide can also serve as the main material for forming the diffusion film 13. The particle size of the calcium carbonate is, for example, about 2 to 4 μm, while the particle size of the halogen calcium phosphate and aluminum oxide are about 4 to 6 μm and 1 to 2 μm, respectively. When the light transmittance is required to be 85% to 92%, the average thickness for the optical diffusion coating mainly having the calcium carbonate may be about 20 to about 30 μm, while the average thickness for the optical diffusion coating mainly having the halogen calcium phosphate may be about 25 to about 35 μm, and/or the average thickness for the optical diffusion coating mainly having the aluminum oxide may be about 10 to about 15 μm. However, when the required light transmittance is up to 92% and even higher, the optical diffusion coating mainly having the calcium carbonate, the halogen calcium phosphate, or the aluminum oxide should be even thinner.

The main material and the corresponding thickness of the optical diffusion coating can be decided according to the place for which the lamp tube 1 is used and the light transmittance required. It is noted that the higher the light transmittance of the diffusion film is required, the more apparent the grainy visual of the light sources is.

Referring to FIG. 17, the inner circumferential surface of the lamp tube 1 may also be provided or bonded with a reflective film 12. The reflective film 12 is provided around the LED light sources 202, and occupies a portion of an area of the inner circumferential surface of the lamp tube 1 arranged along the circumferential direction thereof. As shown in FIG. 17, the reflective film 12 is disposed at two sides of the LED light strip 2 extending along a circumferential direction of the lamp tube 1. The LED light strip 2 is basically in a middle position of the lamp tube 1 and between the two reflective films 12. The reflective film 12, when viewed by a person looking at the lamp tube from the side (in the X-direction shown in FIG. 17), serves to block the LED light sources 202, so that the person does not directly see the LED light sources 202, thereby reducing the visual graininess effect. On the other hand, that the lights emitted from the LED light sources 202 are reflected by the reflective film 12 facilitates the divergence angle control of the LED tube lamp, so that more lights illuminate toward directions without the reflective film 12, such that the LED tube lamp has higher energy efficiency when providing the same level of illumination performance.

Specifically, the reflection film 12 is provided on the inner peripheral surface of the lamp tube 1, and has an opening 12a configured to accommodate the LED light strip 2. The size of the opening 12a is the same or slightly larger than the size of the LED light strip 2. During assembly, the LED light sources 202 are mounted on the LED light strip 2 (a bendable circuit sheet) provided on the inner surface of the lamp tube 1, and then the reflective film 12 is adhered to the inner surface of the lamp tube 1, so that the opening 12a of the reflective film 12 correspondingly matches the LED light strip 2 in a one-to-one relationship, and the LED light strip 2 is exposed to the outside of the reflective film 12.

In one embodiment, the reflectance of the reflective film 12 is generally at least greater than 85%, in some embodiments greater than 90%, and in some embodiments greater than 95%, to be most effective. In one embodiment, the reflective film 12 extends circumferentially along the length of the lamp tube 1 occupying about 30% to 50% of the inner surface area of the lamp tube 1. In other words, a ratio of a circumferential length of the reflective film 12 along the inner circumferential surface of the lamp tube 1 to a circumferential length of the lamp tube 1 is about 0.3 to 0.5. In the illustrated embodiment of FIG. 17, the reflective film 12 is disposed substantially in the middle along a circumferential direction of the lamp tube 1, so that the two distinct portions or sections of the reflective film 12 disposed on the two sides of the LED light strip 2 are substantially equal in area. The reflective film 12 may be made of PET with some reflective materials such as strontium phosphate or barium sulfate or any combination thereof, with a thickness between about 140 μm and about 350 μm or between about 150 μm and about 220 μm for a more preferred effect in some embodiments. As shown in FIG. 18, in other embodiments, the reflective film 12 may be provided along the circumferential direction of the lamp tube 1 on only one side of the LED light strip 2 while occupying the same percentage of the inner surface area of the lamp tube 1 (e.g., 15% to 25% for the one side). Alternatively, as shown in FIGS. 19 and 20, the reflective film 12 may be provided without any opening, and the reflective film 12 is directly adhered or mounted to the inner surface of the lamp tube 1 and followed by mounting or fixing the LED light strip 2 on the reflective film 12 such that the reflective film 12 positioned on one side or two sides of the LED light strip 2.

In the above mentioned embodiments, various types of the reflective film 12 and the diffusion film 13 can be adopted to accomplish optical effects including single reflection, single diffusion, and/or combined reflection-diffusion. For example, the lamp tube 1 may be provided with only the reflective film 12, and no diffusion film 13 is disposed inside the lamp tube 1, such as shown in FIGS. 19, 20, and 21.

In other embodiments, the width of the LED light strip 2 (along the circumferential direction of the lamp tube) can be widened to occupy a circumference area of the inner circumferential surface of the lamp tube 1. Since the LED light strip 2 has on its surface a circuit protective layer made of an ink which can reflect lights, the widen part of the LED light strip 2 functions like the reflective film 12 as mentioned above. In some embodiments, a ratio of the length of the LED light strip 2 along the circumferential direction to the circumferential length of the lamp tube 1 is about 0.3 to 0.5. The light emitted from the light sources could be concentrated by the reflection of the widen part of the LED light strip 2.

In other embodiments, the inner surface of the glass made lamp tube may be coated totally with the optical diffusion coating, or partially with the optical diffusion coating (where the reflective film 12 is coated have no optical diffusion coating). No matter in what coating manner, in some embodiments, it is more desirable that the optical diffusion coating be coated on the outer surface of the rear end region of the lamp tube 1 so as to firmly secure the end cap 3 with the lamp tube 1.

In the present invention, the light emitted from the light sources may be processed with the abovementioned diffusion film, reflective film, other kinds of diffusion layer sheets, adhesive film, or any combination thereof.

Referring again to FIG. 2, the LED tube lamp according to some embodiments of present invention also includes an adhesive sheet 4, an insulation adhesive sheet 7, and an optical adhesive sheet 8. The LED light strip 2 is fixed by the adhesive sheet 4 to an inner circumferential surface of the lamp tube 1. The adhesive sheet 4 may be but is not limited to a silicone adhesive. The adhesive sheet 4 may be in form of several short pieces or a long piece. Various kinds of the adhesive sheet 4, the insulation adhesive sheet 7, and the optical adhesive sheet 8 can be combined to constitute various embodiments of the present invention.

The insulation adhesive sheet 7 is coated on the surface of the LED light strip 2 that faces the LED light sources 202 so that the LED light strip 2 is not exposed and thus electrically insulated from the outside environment. In application of the insulation adhesive sheet 7, a plurality of through holes 71 on the insulation adhesive sheet 7 are reserved to correspondingly accommodate the LED light sources 202 such that the LED light sources 202 are mounted in the through holes 701. The material composition of the insulation adhesive sheet 7 may include, for example vinyl silicone, hydrogen polysiloxane and aluminum oxide. The insulation adhesive sheet 7 has a thickness, for example, ranging from about 100 μm to about 140 μm (micrometers). The insulation adhesive sheet 7 having a thickness less than 100 μm typically does not produce sufficient insulating effect, while the insulation adhesive sheet 7 having a thickness more than 140 μm may result in material waste.

Figure 37:
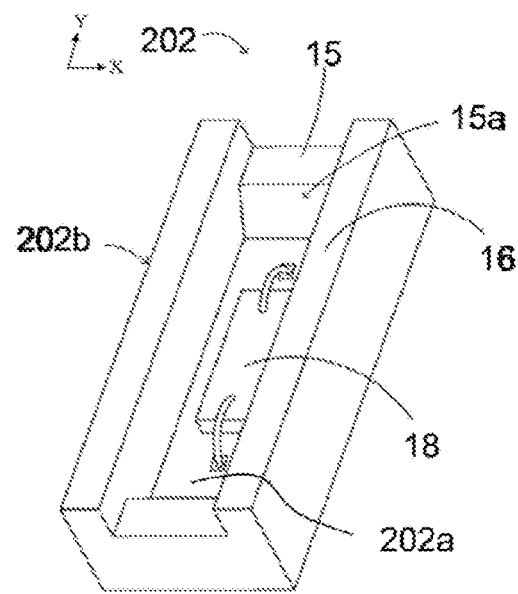
FIG. 37 is a perspective view schematically illustrating an LED lead frame for the LED light sources of the LED tube lamp according to one embodiment of the present invention.

The optical adhesive sheet 8, which is a clear or transparent material, is applied or coated on the surface of the LED light source 202 in order to ensure optimal light transmittance. After being applied to the LED light sources 202, the optical adhesive sheet 8 may have a granular, strip-like or sheet-like shape. The performance of the optical adhesive sheet 8 depends on its refractive index and thickness. The refractive index of the optical adhesive sheet 8 is in some embodiments between 1.22 and 1.6. In some embodiments, it is better for the optical adhesive sheet 8 to have a refractive index being a square root of the refractive index of the housing or casing of the LED light source 202, or the square root of the refractive index of the housing or casing of the LED light source 202 plus or minus 15%, to contribute better light transmittance. The housing/casing of the LED light sources 202 is a structure to accommodate and carry the LED dies (or chips) such as a LED lead frame 202b as shown in FIG. 37. The refractive index of the optical adhesive sheet 8 may range from 1.225 to 1.253. In some embodiments, the thickness of the optical adhesive sheet 8 may range from 1.1 mm to 1.3 mm. The optical adhesive sheet 8 having a thickness less than 1.1 mm may not be able to cover the LED light sources 202, while the optical adhesive sheet 8 having a thickness more than 1.3 mm may reduce light transmittance and increases material cost.

Figure 22:
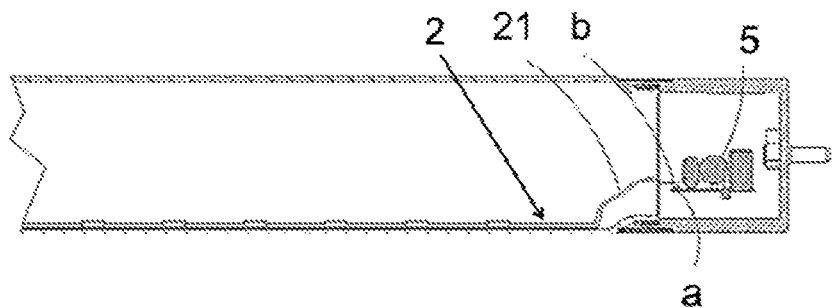
FIG. 22 is a plane sectional view schematically illustrating the LED light strip is a bendable circuit sheet with ends thereof passing across the transition region of the lamp tube of the LED tube lamp to be soldering bonded to the output terminals of the power supply according to one embodiment of the present invention.

In some embodiments, in the process of assembling the LED light sources to the LED light strip, the optical adhesive sheet 8 is first applied on the LED light sources 202; then the insulation adhesive sheet 7 is coated on one side of the LED light strip 2; then the LED light sources 202 are fixed or mounted on the LED light strip 2; the other side of the LED light strip 2 being opposite to the side of mounting the LED light sources 202 is bonded and affixed to the inner surface of the lamp tube 1 by the adhesive sheet 4; finally, the end cap 3 is fixed to the end portion of the lamp tube 1, and the LED light sources 202 and the power supply 5 are electrically connected by the LED light strip 2. As shown in the embodiment of FIG. 22, the bendable circuit sheet 2 passes the transition region 103 to be soldered or traditionally wire-bonded with the power supply 5, and then the end cap 3 having the structure as shown in FIG. 3 or 4 or FIG. 6 is adhered to the strengthened transition region 103 via methods as shown in FIG. 5 or FIG. 7, respectively to form a complete LED tube lamp.

In this embodiment, the LED light strip 2 is fixed by the adhesive sheet 4 to an inner circumferential surface of the lamp tube 1, so as to increase the light illumination angle of the LED tube lamp and broaden the viewing angle to be greater than 330 degrees. By means of applying the insulation adhesive sheet 7 and the optical adhesive sheet 8, electrical insulation of the entire light strip 2 is accomplished such that electrical shock would not occur even when the lamp tube 1 is broken and therefore safety could be improved.

Furthermore, the inner peripheral surface or the outer circumferential surface of the glass made lamp tube 1 may be covered or coated with an adhesive film (not shown) to isolate the inside from the outside of the glass made lamp tube 1 when the glass made lamp tube 1 is broken. In this embodiment, the adhesive film is coated on the inner peripheral surface of the lamp tube 1. The material for the coated adhesive film includes, for example, methyl vinyl silicone oil, hydro silicone oil, xylene, and calcium carbonate, wherein xylene is used as an auxiliary material. The xylene will be volatilized and removed when the coated adhesive film on the inner surface of the lamp tube 1 solidifies or hardens. The xylene is mainly used to adjust the capability of adhesion and therefore to control the thickness of the coated adhesive film.

In one embodiment, the thickness of the coated adhesive film is preferably between about 100 and about 140 micrometers (μm). The adhesive film having a thickness being less than 100 micrometers may not have sufficient shatterproof capability for the glass tube, and the glass tube is thus prone to crack or shatter. The adhesive film having a thickness being larger than 140 micrometers may reduce the light transmittance and also increase material cost. The thickness of the coated adhesive film may be between about 10 and about 800 micrometers (μm) when the shatterproof capability and the light transmittance are not strictly demanded.

In one embodiment, the inner peripheral surface or the outer circumferential surface of the glass made lamp tube 1 is coated with an adhesive film such that the broken pieces are adhered to the adhesive film when the glass made lamp tube is broken. Therefore, the lamp tube 1 would not be penetrated to form a through hole connecting the inside and outside of the lamp tube 1 and thus prevents a user from touching any charged object inside the lamp tube 1 to avoid electrical shock. In addition, the adhesive film is able to diffuse light and allows the light to transmit such that the light uniformity and the light transmittance of the entire LED tube lamp increases. The adhesive film can be used in combination with the adhesive sheet 4, the insulation adhesive sheet 7 and the optical adhesive sheet 8 to constitute various embodiments of the present invention. As the LED light strip 2 is configured to be a bendable circuit sheet, no coated adhesive film is thereby required.

Furthermore, the light strip 2 may be an elongated aluminum plate, FR 4 board, or a bendable circuit sheet. When the lamp tube 1 is made of glass, adopting a rigid aluminum plate or FR4 board would make a broken lamp tube, e.g., broken into two parts, remain a straight shape so that a user may be under a false impression that the LED tube lamp is still usable and fully functional, and it is easy for him to incur electric shock upon handling or installation of the LED tube lamp. Because of added flexibility and bendability of the flexible substrate for the LED light strip 2, the problem faced by the aluminum plate, FR4 board, or conventional 3-layered flexible board having inadequate flexibility and bendability, are thereby addressed. In certain embodiments, a bendable circuit sheet is adopted as the LED light strip 2 for that such a LED light strip 2 would not allow a ruptured or broken lamp tube to maintain a straight shape and therefore instantly inform the user of the disability of the LED tube lamp and avoid possibly incurred electrical shock. The following are further descriptions of the bendable circuit sheet used as the LED light strip 2.

Figure 23:
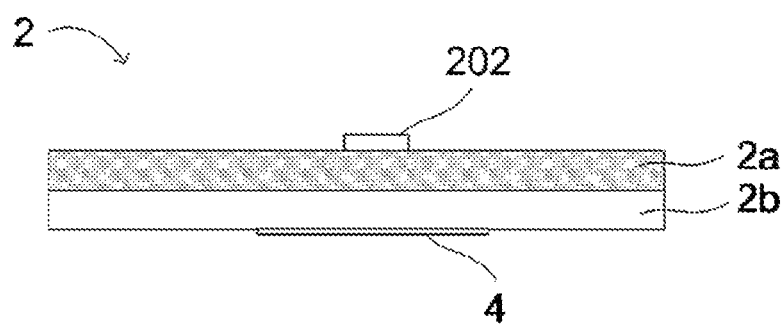
FIG. 23 is a plane cross-sectional view schematically illustrating a bi-layered structure of the bendable circuit sheet of the LED light strip of the LED tube lamp according to an embodiment of the present invention.

Referring to FIG. 23, in one embodiment, the LED light strip 2 includes a bendable circuit sheet having a conductive wiring layer 2a and a dielectric layer 2b that are arranged in a stacked manner, wherein the wiring layer 2a and the dielectric layer 2b have same areas. The LED light source 202 is disposed on one surface of the wiring layer 2a, the dielectric layer 2b is disposed on the other surface of the wiring layer 2a that is away from the LED light sources 202. The wiring layer 2a is electrically connected to the power supply 5 to carry direct current (DC) signals. Meanwhile, the surface of the dielectric layer 2b away from the wiring layer 2a is fixed to the inner circumferential surface of the lamp tube 1 by means of the adhesive sheet 4. The wiring layer 2a can be a metal layer or a power supply layer including wires such as copper wires.

In another embodiment, the outer surface of the wiring layer 2a or the dielectric layer 2b may be covered with a circuit protective layer made of an ink with function of resisting soldering and increasing reflectivity. Alternatively, the dielectric layer can be omitted and the wiring layer can be directly bonded to the inner circumferential surface of the lamp tube, and the outer surface of the wiring layer 2a is coated with the circuit protective layer. Whether the wiring layer 2a has a one-layered, or two-layered structure, the circuit protective layer can be adopted. In some embodiments, the circuit protective layer is disposed only on one side/surface of the LED light strip 2, such as the surface having the LED light source 202. In some embodiments, the bendable circuit sheet is a one-layered structure made of just one wiring layer 2a, or a two-layered structure made of one wiring layer 2a and one dielectric layer 2b, and thus is more bendable or flexible to curl when compared with the conventional three-layered flexible substrate (one dielectric layer sandwiched with two wiring layers). As a result, the bendable circuit sheet of the LED light strip 2 can be installed in a lamp tube with a customized shape or non-tubular shape, and fitly mounted to the inner surface of the lamp tube. The bendable circuit sheet closely mounted to the inner surface of the lamp tube is preferable in some cases. In addition, using fewer layers of the bendable circuit sheet improves the heat dissipation and lowers the material cost.

Nevertheless, the bendable circuit sheet is not limited to being one-layered or two-layered; in other embodiments, the bendable circuit sheet may include multiple layers of the wiring layers 2a and multiple layers of the dielectric layers 2b, in which the dielectric layers 2b and the wiring layers 2a are sequentially stacked in a staggered manner, respectively. These stacked layers are away from the surface of the outermost wiring layer 2a which has the LED light source 202 disposed thereon and is electrically connected to the power supply 5. Moreover, the length of the bendable circuit sheet is greater than the length of the lamp tube.

Figure 48:
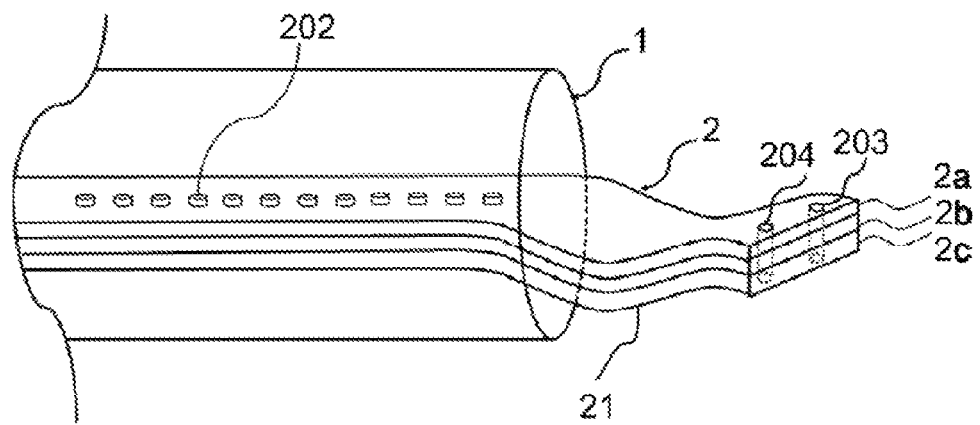
FIG. 48 is a perspective view schematically illustrating the bendable circuit sheet of the LED light strip is formed with two conductive wiring layers according to another embodiment of the present invention.

Referring to FIG. 48, in one embodiment, the LED light strip 2 includes a bendable circuit sheet having in sequence a first wiring layer 2a, a dielectric layer 2b, and a second wiring layer 2c. The thickness of the second wiring layer 2c is greater than that of the first wiring layer 2a, and the length of the LED light strip 2 is greater than that of the lamp tube 1. The end region of the light strip 2 extending beyond the end portion of the lamp tube 1 without disposition of the light source 202 is formed with two separate through holes 203 and 204 to respectively electrically communicate the first wiring layer 2a and the second wiring layer 2c. The through holes 203 and 204 are not communicated to each other to avoid short.

In this way, the greater thickness of the second wiring layer 2c allows the second wiring layer 2c to support the first wiring layer 2a and the dielectric layer 2b, and meanwhile allow the LED light strip 2 to be mounted onto the inner circumferential surface without being liable to shift or deform, and thus the yield rate of product can be improved. In addition, the first wiring layer 2a and the second wiring layer 2c are in electrical communication such that the circuit layout of the first wiring later 2a can be extended downward to the second wiring layer 2c to reach the circuit layout of the entire LED light strip 2. Moreover, since the land for the circuit layout becomes two-layered, the area of each single layer and therefore the width of the LED light strip 2 can be reduced such that more LED light strips 2 can be put on a production line to increase productivity.

Furthermore, the first wiring layer 2a and the second wiring layer 2c of the end region of the LED light strip 2 that extends beyond the end portion of the lamp tube 1 without disposition of the light source 202 can be used to accomplish the circuit layout of a power supply module so that the power supply module can be directly disposed on the bendable circuit sheet of the LED light strip 2.

Referring to FIG. 2, in one embodiment, the LED light strip 2 has a plurality of LED light sources 202 mounted thereon, and the end cap 3 has a power supply 5 installed therein. The LED light sources 202 and the power supply 5 are electrically connected by the LED light strip 2. The power supply 5 may be a single integrated unit (i.e., all of the power supply components are integrated into one module unit) installed in one end cap 3. Alternatively, the power supply 5 may be divided into two separate units (i.e. the power supply components are divided into two parts) installed in two end caps 3, respectively. When only one end of the lamp tube 1 is strengthened by a glass tempering process, it may be preferable that the power supply 5 is a single integrated unit and installed in the end cap 3 corresponding to the strengthened end of the lamp tube 1.

The power supply 5 can be fabricated by various ways. For example, the power supply 5 may be an encapsulation body formed by injection molding a silica gel with high thermal conductivity such as being greater than 0.7 w/m·k. This kind of power supply has advantages of high electrical insulation, high heat dissipation, and regular shape to match other components in an assembly. Alternatively, the power supply 5 in the end caps may be a printed circuit board having components that are directly exposed or packaged by a conventional heat shrink sleeve. The power supply 5 according to some embodiments of the present invention can be a single printed circuit board provided with a power supply module as shown in FIG. 23 or a single integrated unit as shown in FIG. 38.

Figure 38:
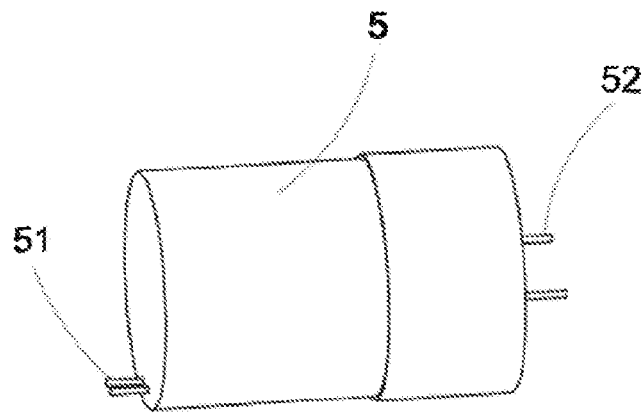
FIG. 38 is a perspective view schematically illustrating a power supply of the LED tube lamp according to one embodiment of the present invention.

Referring to FIGS. 2 and 38, in one embodiment of the present invention, the power supply 5 is provided with a male plug 51 at one end and a metal pin 52 at the other end, one end of the LED light strip 2 is correspondingly provided with a female plug 201, and the end cap 3 is provided with a hollow conductive pin 301 to be connected with an outer electrical power source. Specifically, the male plug 51 is fittingly inserted into the female plug 201 of the LED light strip 2, while the metal pins 52 are fittingly inserted into the hollow conductive pins 301 of the end cap 3. The male plug 51 and the female plug 201 function as a connector between the power supply 5 and the LED light strip 2. Upon insertion of the metal pin 502, the hollow conductive pin 301 is punched with an external punching tool to slightly deform such that the metal pin 502 of the power supply 5 is secured and electrically connected to the hollow conductive pin 301. Upon turning on the electrical power, the electrical current passes in sequence through the hollow conductive pin 301, the metal pin 502, the male plug 501, and the female plug 201 to reach the LED light strip 2 and go to the LED light sources 202. However, the power supply 5 of the present invention is not limited to the modular type as shown in FIG. 38. The power supply 5 may be a printed circuit board provided with a power supply module and electrically connected to the LED light strip 2 via the abovementioned the male plug 51 and female plug 52 combination.

In another embodiment, a traditional wire bonding technique can be used instead of the male plug 51 and the female plug 52 for connecting any kind of the power supply 5 and the light strip 2. Furthermore, the wires may be wrapped with an electrically insulating tube to protect a user from being electrically shocked. However, the bonded wires tend to be easily broken during transportation and can therefore cause quality issues.

In still another embodiment, the connection between the power supply 5 and the LED light strip 2 may be accomplished via tin soldering, rivet bonding, or welding. One way to secure the LED light strip 2 is to provide the adhesive sheet 4 at one side thereof and adhere the LED light strip 2 to the inner surface of the lamp tube 1 via the adhesive sheet 4. Two ends of the LED light strip 2 can be either fixed to or detached from the inner surface of the lamp tube 1.

In case that two ends of the LED light strip 2 are fixed to the inner surface of the lamp tube 1, it may be preferable that the bendable circuit sheet of the LED light strip 2 is provided with the female plug 201 and the power supply is provided with the male plug 51 to accomplish the connection between the LED light strip 2 and the power supply 5. In this case, the male plug 51 of the power supply 5 is inserted into the female plug 201 to establish electrical connection.

In case that two ends of the LED light strip 2 are detached from the inner surface of the lamp tube and that the LED light strip 2 is connected to the power supply 5 via wire-bonding, any movement in subsequent transportation is likely to cause the bonded wires to break. Therefore, a preferable option for the connection between the light strip 2 and the power supply 5 could be soldering. Specifically, referring to FIG. 22, the ends of the LED light strip 2 including the bendable circuit sheet are arranged to pass over the strengthened transition region 103 and directly soldering bonded to an output terminal of the power supply 5 such that the product quality is improved without using wires. In this way, the female plug 201 and the male plug 51 respectively provided for the LED light strip 2 and the power supply 5 are no longer needed.

Figure 24:
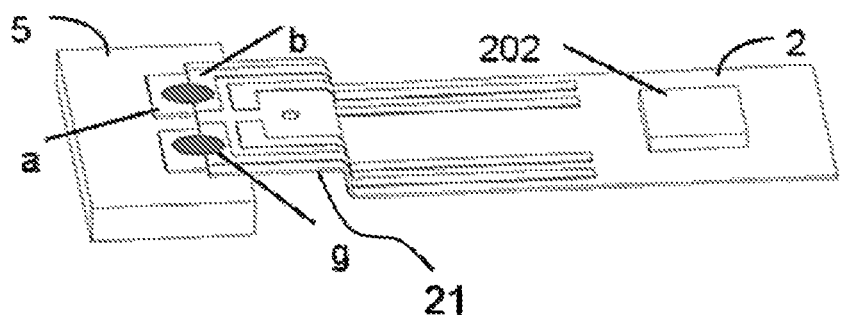
FIG. 24 is a perspective view schematically illustrating the soldering pad of the bendable circuit sheet of the LED light strip for soldering connection with the printed circuit board of the power supply of the LED tube lamp according to one embodiment of the present invention.
Figure 30:
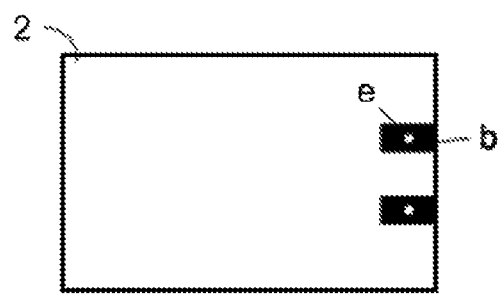
FIG. 30 is a plane view schematically illustrating through holes are formed on the soldering pads of the bendable circuit sheet of the LED light strip of the LED tube lamp according to one embodiment of the present invention.

Referring to FIG. 24, an output terminal of the printed circuit board of the power supply 5 may have soldering pads "a" provided with an amount of tin solder with a thickness sufficient to later form a solder joint. Correspondingly, the ends of the LED light strip 2 may have soldering pads "b". The soldering pads "a" on the output terminal of the printed circuit board of the power supply 5 are soldered to the soldering pads "b" on the LED light strip 2 via the tin solder on the soldering pads "a". The soldering pads "a" and the soldering pads "b" may be face to face during soldering such that the connection between the LED light strip 2 and the printed circuit board of the power supply 5 is the most firm. However, this kind of soldering typically includes that a thermo-compression head presses on the rear surface of the LED light strip 2 and heats the tine solder, i.e. the LED light strip 2 intervenes between the thermo-compression head and the tin solder, and therefore may easily cause reliability problems. Referring to FIG. 30, a through hole may be formed in each of the soldering pads "b" on the LED light strip 2 to allow the soldering pads "b" overlay the soldering pads "a" without face-to-face and the thermo-compression head directly presses tin solders on the soldering pads "a" on surface of the printed circuit board of the power supply 5 when the soldering pads "a" and the soldering pads "b" are vertically aligned. This is an easy way to accomplish in practice.

Referring again to FIG. 24, two ends of the LED light strip 2 detached from the inner surface of the lamp tube 1 are formed as freely extending portions 21, while most of the LED light strip 2 is attached and secured to the inner surface of the lamp tube 1. One of the freely extending portions 21 has the soldering pads "b" as mentioned above. Upon assembling of the LED tube lamp, the freely extending end portions 21 along with the soldered connection of the printed circuit board of the power supply 5 and the LED light strip 2 would be coiled, curled up or deformed to be fittingly accommodated inside the lamp tube 1. When the bendable circuit sheet of the LED light strip 2 includes in sequence the first wiring layer 2a, the dielectric layer 2b, and the second wiring layer 2c as shown in FIG. 48, the freely extending end portions 21 can be used to accomplish the connection between the first wiring layer 2a and the second wiring layer 2c and arrange the circuit layout of the power supply 5.

In this embodiment, during the connection of the LED light strip 2 and the power supply 5, the soldering pads "b" and the soldering pads "a" and the LED light sources 202 are on surfaces facing toward the same direction and the soldering pads "b" on the LED light strip 2 are each formed with a through hole "e" as shown in FIG. 30 such that the soldering pads "b" and the soldering pads "a" communicate with each other via the through holes "e". When the freely extending end portions 21 are deformed due to contraction or curling up, the soldered connection of the printed circuit board of the power supply 5 and the LED light strip 2 exerts a lateral tension on the power supply 5. Furthermore, the soldered connection of the printed circuit board of the power supply 5 and the LED light strip 2 also exerts a downward tension on the power supply 5 when compared with the situation where the soldering pads "a" of the power supply 5 and the soldering pads "b" of the LED light strip 2 are face to face. This downward tension on the power supply 5 comes from the tin solders inside the through holes "e" and forms a stronger and more secure electrical connection between the LED light strip 2 and the power supply 5.

Figure 25:
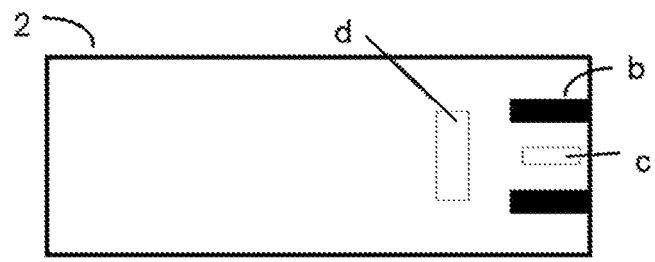
FIG. 25 is a plane view schematically illustrating the arrangement of the soldering pads of the bendable circuit sheet of the LED light strip of the LED tube lamp according to one embodiment of the present invention.

Referring to FIG. 25, in one embodiment, the soldering pads "b" of the LED light strip 2 are two separate pads to electrically connect the positive and negative electrodes of the bendable circuit sheet of the LED light strip 2, respectively. The size of the soldering pads "b" may be, for example, about 3.5×2 mm$^2$. The printed circuit board of the power supply 5 is correspondingly provided with soldering pads "a" having reserved tin solders, and the height of the tin solders suitable for subsequent automatic soldering bonding process is generally, for example, about 0.1 to 0.7 mm, in some preferable embodiments about 0.3 to about 0.5 mm, and in some even more preferable embodiments about 0.4 mm. An electrically insulating through hole "c" may be formed between the two soldering pads "b" to isolate and prevent the two soldering pads from electrically short during soldering. Furthermore, an extra positioning opening "d" may also be provided behind the electrically insulating through hole "c" to allow an automatic soldering machine to quickly recognize the position of the soldering pads "b".

Figure 26:
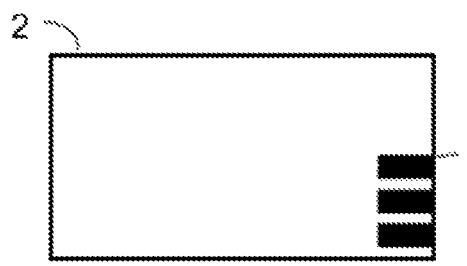
FIG. 26 is a plane view schematically illustrating a row of three soldering pads of the bendable circuit sheet of the LED light strip of the LED tube lamp according to another embodiment of the present invention.
Figure 27:
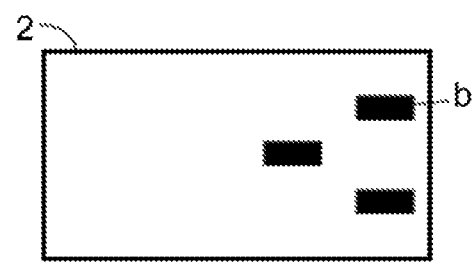
FIG. 27 is a plane view schematically illustrating two rows of soldering pads of the bendable circuit sheet of the LED light strip of the LED tube lamp according to still another embodiment of the present invention.
Figure 28:
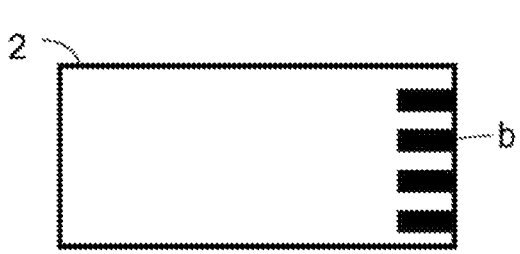
FIG. 28 is a plane view schematically illustrating a row of four soldering pads of the bendable circuit sheet of the LED light strip of the LED tube lamp according to yet another embodiment of the present invention.
Figure 29:
FIG. 29 is a plane view schematically illustrating two rows of two soldering pads of the bendable circuit sheet of the LED light strip of the LED tube lamp according to yet still another embodiment of the present invention.

For the sake of achieving scalability and compatibility, the amount of the soldering pads "b" on each end of the LED light strip 2 may be more than one such as two, three, four, or more than four. When there is only one soldering pad "b" provided at each end of the LED light strip 2, the two ends of the LED light strip 2 are electrically connected to the power supply 5 to form a loop, and various electrical components can be used. For example, a capacitance may be replaced by an inductance to perform current regulation. Referring to FIGS. 26 to 28, when each end of the LED light strip 2 has three soldering pads, the third soldering pad can be grounded; when each end of the LED light strip 2 has four soldering pads, the fourth soldering pad can be used as a signal input terminal. Correspondingly, in some embodiments, the power supply 5 should have same amount of soldering pads "a" as that of the soldering pads "b" on the LED light strip 2. In some embodiments, as long as electrical short between the soldering pads "b" can be prevented, the soldering pads "b" should be arranged according to the dimension of the actual area for disposition, for example, three soldering pads can be arranged in a row or two rows. In other embodiments, the amount of the soldering pads "b" on the bendable circuit sheet of the LED light strip 2 may be reduced by rearranging the circuits on the bendable circuit sheet of the LED light strip 2. The lesser the amount of the soldering pads, the easier the fabrication process becomes. On the other hand, a greater number of soldering pads may improve and secure the electrical connection between the LED light strip 2 and the output terminal of the power supply 5.

Referring to FIG. 30, in another embodiment, the soldering pads "b" each is formed with a through hole "e" having a diameter generally of about 1 to 2 mm, in some preferred embodiments of about 1.2 to 1.8 mm, and in yet further preferred embodiments of about 1.5 mm. The through hole "e" communicates the soldering pad "a" with the soldering pad "b" so that the tin solder on the soldering pads "a" passes through the through holes "e" and finally reach the soldering pads "b". A smaller through hole "e" would make it difficult for the tin solder to pass. The tin solder accumulates around the through holes "e" upon exiting the through holes "e" and condense to form a solder ball "g" with a larger diameter than that of the through holes "e" upon condensing. Such a solder ball "g" functions as a rivet to further increase the stability of the electrical connection between the soldering pads "a" on the power supply 5 and the soldering pads "b" on the LED light strip 2.

Figure 31:
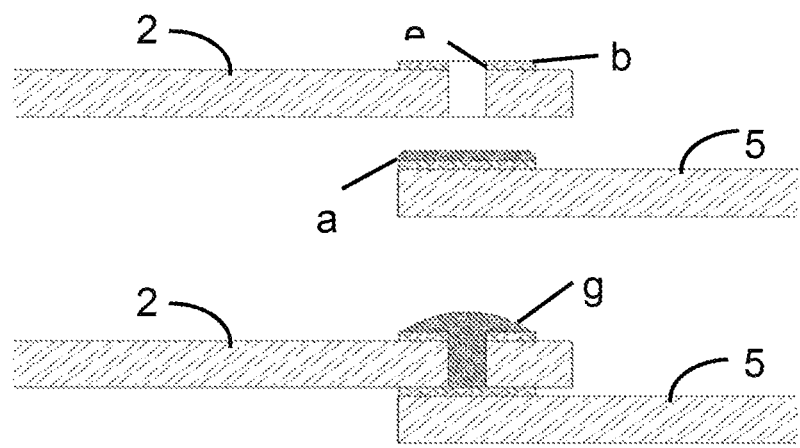
FIG. 31 is a plane cross-sectional view schematically illustrating soldering bonding process utilizing the soldering pads of the bendable circuit sheet of the LED light strip of FIG. 30 taken from side view and the printed circuit board of the power supply according to one embodiment of the present invention.
Figure 32:
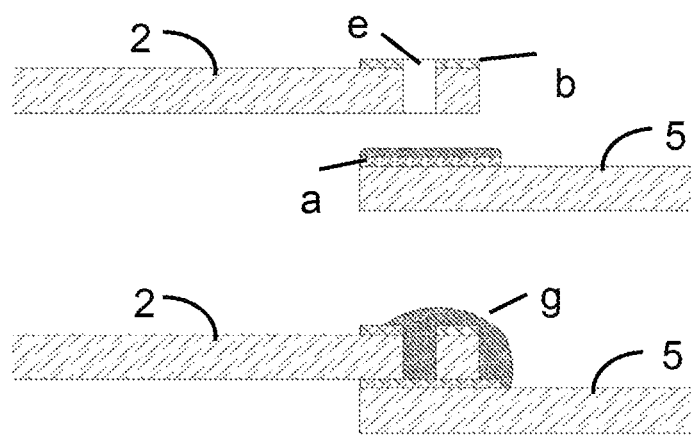
FIG. 32 is a plane cross-sectional view schematically illustrating soldering bonding process utilizing the soldering pads of the bendable circuit sheet of the LED light strip of FIG. 30 taken from side view and the printed circuit board of the power supply according to another embodiment of the present invention, wherein the through hole of the soldering pads is near the edge of the bendable circuit sheet.
Figure 33:
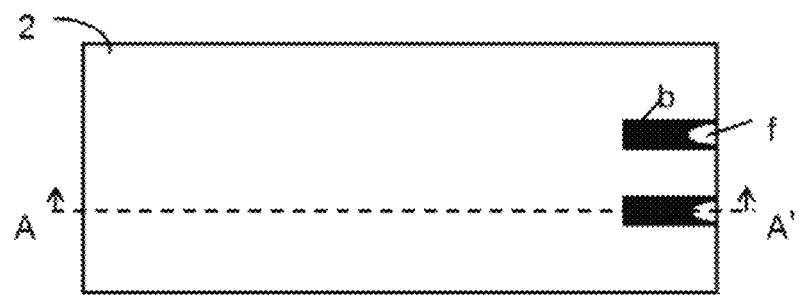
FIG. 33 is a plane view schematically illustrating notches formed on the soldering pads of the bendable circuit sheet of the LED light strip of the LED tube lamp according to one embodiment of the present invention.
Figure 34:
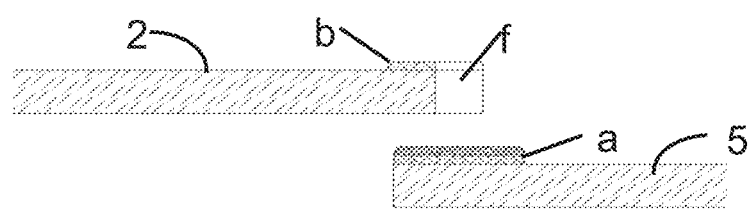
FIG. 34 is an exemplary plane cross-sectional view of FIG. 33 taken along a line A-A'.
Figure 34:
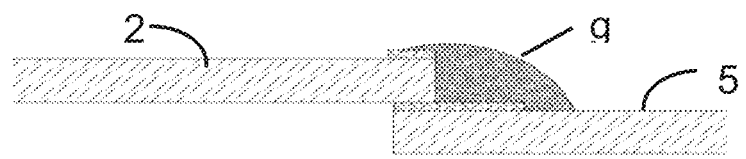

Referring to FIGS. 31 to 32, in other embodiments, when a distance from the through hole "e" to the side edge of the LED light strip 2 is less than 1 mm, the tin solder may pass through the through hole "e" to accumulate on the periphery of the through hole "e", and extra tin solder may spill over the soldering pads "b" to reflow along the side edge of the LED light strip 2 and join the tin solder on the soldering pads "a" of the power supply 5. The tin solder then condenses to form a structure like a rivet to firmly secure the LED light strip 2 onto the printed circuit board of the power supply 5 such that reliable electric connection is achieved. Referring to FIGS. 33 and 34, in another embodiment, the through hole "e" can be replaced by a notch "f" formed at the side edge of the soldering pads "b" for the tin solder to easily pass through the notch "f" and accumulate on the periphery of the notch "f" and to form a solder ball with a larger diameter than that of the through hole "e" upon condensing. Such a solder ball may be formed like a C-shape rivet to enhance the secure capability of the electrically connecting structure.

Figure 40:
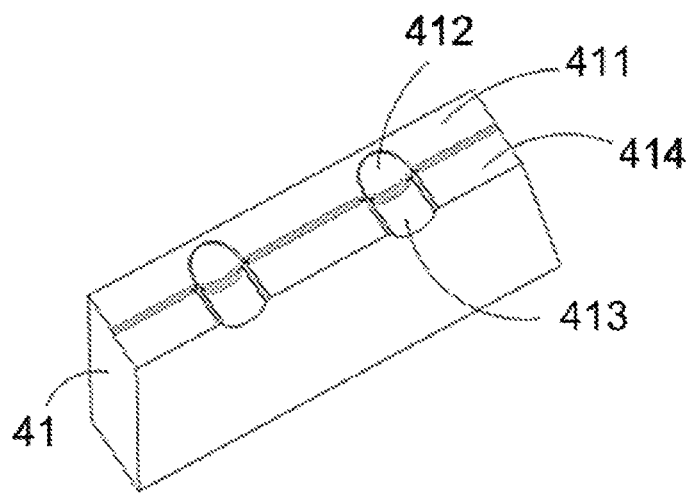
FIG. 40 is a perspective view illustrating a thermoscompression head used in soldering the bendable circuit sheet of the LED light strip and the printed circuit board of the power supply according to one embodiment of the present invention.

The abovementioned through hole "e" or notch "f" might be formed in advance of soldering or formed by direct punching with a thermo-compression head, as shown in FIG. 40, during soldering. The portion of the thermo-compression head for touching the tin solder may be flat, concave, or convex, or any combination thereof. The portion of the thermo-compression head for restraining the object to be soldered such as the LED light strip 2 may be strip-like or grid-like. The portion of the thermo-compression head for touching the tin solder does not completely cover the through hole "e" or the notch "f" to make sure that the tin solder is able to pass through the through hole "e" or the notch "f". The portion of the thermo-compression head being concave may function as a room to receive the solder ball.

Referring to FIG. 40, a thermo-compression head 41 used for bonding the soldering pads "a" on the power supply 5 and the soldering pads "b" on the light strip 2 is mainly composed of four sections: a bonding plane 411, a plurality of concave guiding tanks 412, a plurality of concave molding tanks 413, and a restraining plane 414. The bonding plane 411 is a portion actually touching, pressing and heating the tin solder to perform soldering bonding. The bonding plane 411 may be flat, concave, convex or any combination thereof. The concave guiding tanks 412 are formed on the bonding plane 411 and opened near an edge of the bonding plane 411 to guide the heated and melted tin solder to flow into the through holes or notches formed on the soldering pads. For example, the guiding tanks 412 may function to guide and stop the melted tin solders. The concave molding tanks 413 are positioned beside the guiding tanks 412 and have a concave portion more depressed than that of the guiding tanks 412 such that the concave molding tanks 413 each form a housing to receive the solder ball. The restraining plane 414 is a portion next to the bonding plane 411 and formed with the concave molding tanks 413. The restraining plane 414 is lower than the bonding plane 411 such that the restraining plane 414 firmly presses the LED light strip 2 on the printed circuit board of the power supply 5 while the bonding plane 411 presses against the soldering pads "b" during the soldering bonding. The restraining plane 414 may be strip-like or grid-like on surface. The difference of height of the bonding plane 411 and the restraining plane 414 is the thickness of the LED light strip 2.

Figure 41:
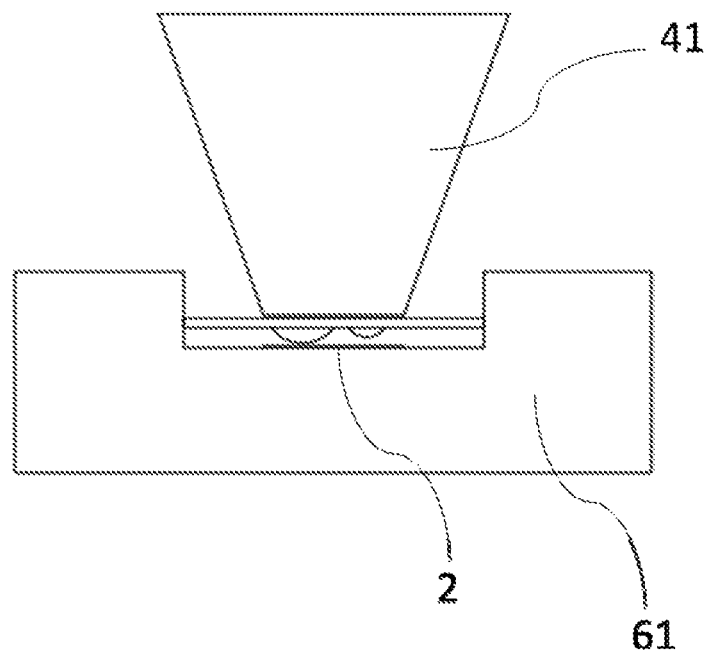
FIG. 41 is a plane view schematically illustrating the thickness difference between two solders on the pads of the bendable circuit sheet of the LED light strip or the printed circuit board of the power supply according to one embodiment of the invention.

Referring to FIGS. 41, 25, and 40, soldering pads corresponding to the soldering pads of the LED light strip are formed on the printed circuit board of the power supply 5 and tin solder is reserved on the soldering pads on the printed circuit board of the power supply 5 for subsequent soldering bonding performed by an automatic soldering bonding machine. The tin solder in some embodiments has a thickness of about 0.3 mm to about 0.5 mm such that the LED light strip 2 can be firmly soldered to the printed circuit board of the power supply 5. As shown in FIG. 41, in case of having height difference between two tin solders respectively reserved on two soldering pads on the printed circuit board of the power supply 5, the higher one will be touched first and melted by the thermo-compression head 41 while the other one will be touched and start to melt until the higher one is melted to a height the same as the height of the other one. This usually incurs unsecured soldering bonding for the reserved tin solder with smaller height, and therefore affects the electrical connection between the LED light strip 2 and the printed circuit board of the power supply 5. To alleviate this problem, in one embodiment, the present invention applies the kinetic equilibrium principal and installs a linkage mechanism on the thermo-compression head 41 to allow rotation of the thermo-compression head 41 during a soldering bonding such that the thermo-compression head 41 starts to heat and melt the two reserved tin solders only when the thermo-compression head 41 detects that the pressure on the two reserved tin solders are the same.

Figure 42:
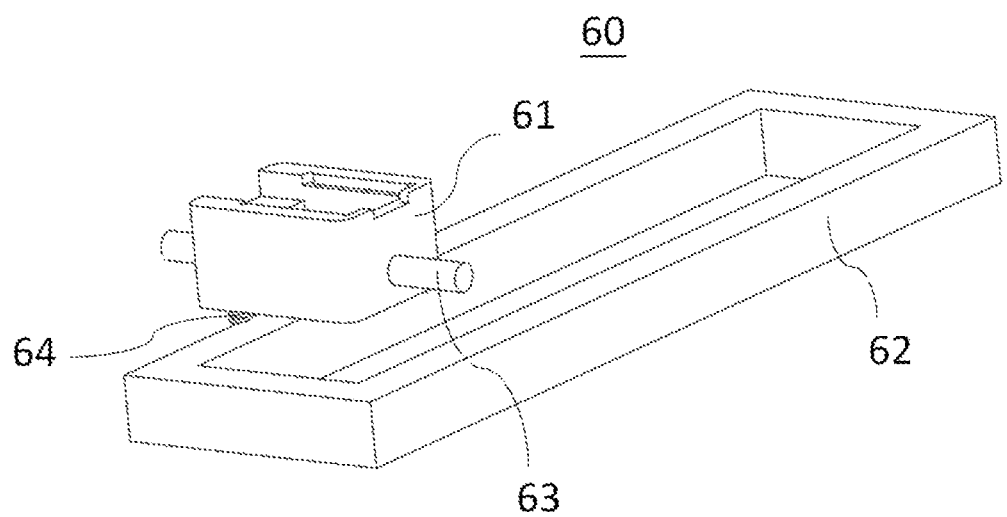
FIG. 42 is a perspective view schematically illustrating the soldering vehicle for soldering the bendable circuit sheet of the LED light strip and the printed circuit board of the power supply according to one embodiment of the invention.
Figure 43:
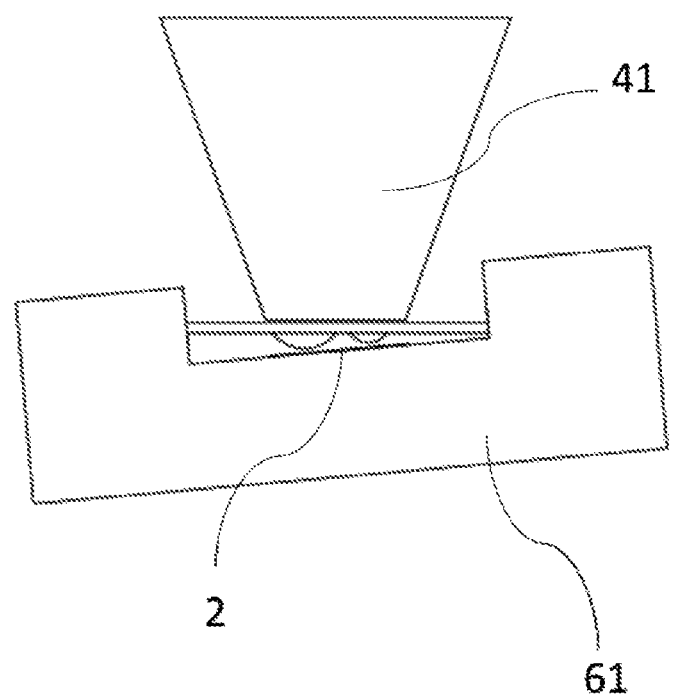
FIG. 43 is an exemplary plan view schematically illustrating a rotation status of the rotary platform of the soldering vehicle in FIG. 41.

In the abovementioned embodiment, the thermo-compression head 41 is rotatable while the LED light strip 2 and the printed circuit board of the power supply 5 remain unmoved. Referring to FIG. 42, in another embodiment, the thermo-compression head 41 is unmoved while the LED light strip is allowed to rotate. In this embodiment, the LED light strip 2 and the printed circuit board of the power supply 5 are loaded on a soldering vehicle 60 including a rotary platform 61, a vehicle holder 62, a rotating shaft 63, and two elastic members 64. The rotary platform 61 functions to carry the LED light strip 2 and the printed circuit board of the power supply 5. The rotary platform 61 is movably mounted to the vehicle holder 62 via the rotating shaft 63 so that the rotary platform 61 is able to rotate with respect to the vehicle holder 62 while the vehicle holder 62 bears and holds the rotary platform 61. The two elastic members 64 are disposed on two sides of the rotating shaft 63, respectively, such that the rotary platform 61 in connection with the rotating shaft 63 always remains at the horizontal level when the rotary platform 61 is not loaded. In this embodiment, the elastic members 64 are springs for example, and the ends thereof are disposed corresponding to two sides of the rotating shaft 63 so as to function as two pivots on the vehicle holder 62. As shown in FIG. 42, when two tin solders reserved on the LED light strip 2 pressed by the thermo-compression head 41 are not at the same height level, the rotary platform 61 carrying the LED light strip 2 and the printed circuit board of the power supply 5 will be driven by the a rotating shaft 63 to rotate until the thermo-compression head 41 detects the same pressure on the two reserved tin solders, and then starts a soldering bonding. Referring to FIG. 43, when the rotary platform 61 rotates, the elastic members 64 at two sides of the rotating shaft 63 are compressed or pulled; and the driving force of the rotating shaft 63 releases and the rotary platform 61 returns to the original height level by the resilience of the elastic members 64 when the soldering bonding is completed.

In other embodiments, the rotary platform 61 may be designed to have mechanisms without using the rotating shaft 63 and the elastic members 64. For example, the rotary platform 61 may be designed to have driving motors and active rotary mechanisms, and therefore the vehicle holder 62 is saved. Accordingly, other embodiments utilizing the kinetic equilibrium principle to drive the LED light strip 2 and the printed circuit board of the power supply 5 to move in order to complete the soldering bonding process are within the spirit of the present invention.

Figure 35:
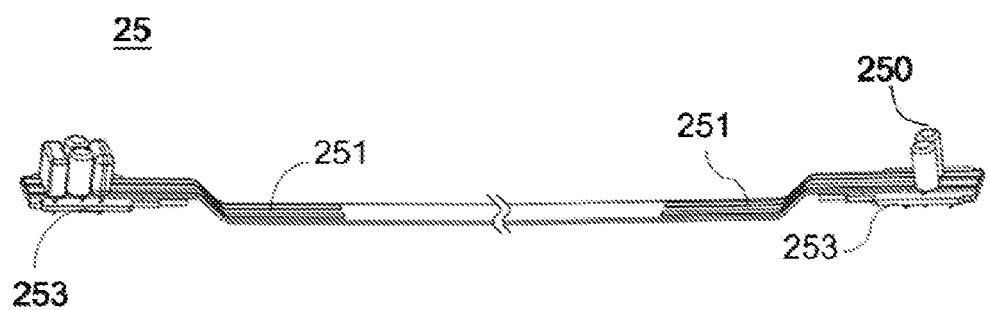
FIG. 35 is a perspective view schematically illustrating a circuit board assembly composed of the bendable circuit sheet of the LED light strip and the printed circuit board of the power supply according to another embodiment of the present invention.
Figure 36:
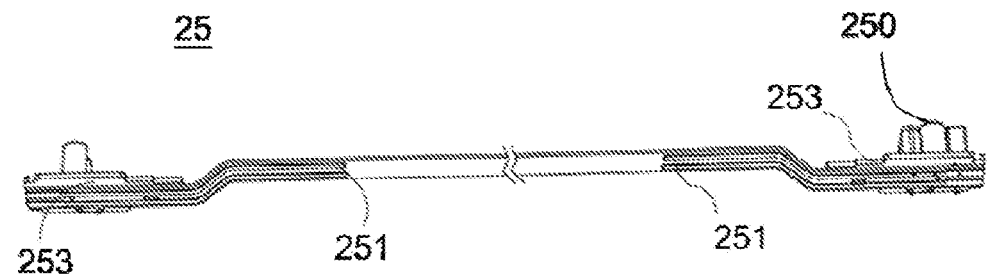
FIG. 36 is a perspective view schematically illustrating another arrangement of the circuit board assembly of FIG. 35.

Referring to FIGS. 35 and 36, in another embodiment, the LED light strip 2 and the power supply 5 may be connected by utilizing a circuit board assembly 25 instead of soldering bonding. The circuit board assembly 25 has a long circuit sheet 251 and a short circuit board 253 that are adhered to each other with the short circuit board 253 being adjacent to the side edge of the long circuit sheet 251. The short circuit board 253 may be provided with power supply module 250 to form the power supply 5. The short circuit board 253 is stiffer or more rigid than the long circuit sheet 251 to be able to support the power supply module 250.

The long circuit sheet 251 may be the bendable circuit sheet of the LED light strip including a wiring layer 2a as shown in FIG. 23. The wiring layer 2a of the long circuit sheet 251 and the power supply module 250 may be electrically connected in various manners depending on the demand in practice. As shown in FIG. 35, the power supply module 250 and the long circuit sheet 251 having the wiring layer 2a on surface are on the same side of the short circuit board 253 such that the power supply module 250 is directly connected to the long circuit sheet 251. As shown in FIG. 36, alternatively, the power supply module 250 and the long circuit sheet 251 including the wiring layer 2a on surface are on opposite sides of the short circuit board 253 such that the power supply module 250 is directly connected to the short circuit board 253 and indirectly connected to the wiring layer 2a of the LED light strip 2 by way of the short circuit board 253.

As shown in FIG. 35, in one embodiment, the long circuit sheet 251 and the short circuit board 253 are adhered together first, and the power supply module 250 is subsequently mounted on the wiring layer 2a of the long circuit sheet 251 serving as the LED light strip 2. The long circuit sheet 251 of the LED light strip 2 herein is not limited to include only one wiring layer 2a and may further include another wiring layer such as the wiring layer 2c shown in FIG. 48. The light sources 202 are disposed on the wiring layer 2a of the LED light strip 2 and electrically connected to the power supply 5 by way of the wiring layer 2a. As shown in FIG. 36, in another embodiment, the long circuit sheet 251 of the LED light strip 2 may include a wiring layer 2a and a dielectric layer 2b. The dielectric layer 2b may be adhered to the short circuit board 253 first and the wiring layer 2a is subsequently adhered to the dielectric layer 2b and extends to the short circuit board 253. All these embodiments are within the scope of applying the circuit board assembly concept of the present invention.

In the above-mentioned embodiments, the short circuit board 253 may have a length generally of about 15 mm to about 40 mm and in some preferable embodiments about 19 mm to about 36 mm, while the long circuit sheet 251 may have a length generally of about 800 mm to about 2800 mm and in some embodiments of about 1200 mm to about 2400 mm. A ratio of the length of the short circuit board 253 to the length of the long circuit sheet 251 ranges from, for example, about 1:20 to about 1:200.

When the ends of the LED light strip 2 are not fixed on the inner surface of the lamp tube 1, the connection between the LED light strip 2 and the power supply 5 via soldering bonding could not firmly support the power supply 5, and it may be necessary to dispose the power supply 5 inside the end cap 3. For example, a longer end cap to have enough space for receiving the power supply 5 would be needed. However, this will reduce the length of the lamp tube under the prerequisite that the total length of the LED tube lamp is fixed according to the product standard, and may therefore decrease the effective illuminating areas.

Referring to FIG. 39, in one embodiment, a hard circuit board 22 made of aluminum is used instead of the bendable circuit sheet, such that the ends or terminals of the hard circuit board 22 can be mounted at ends of the lamp tube 1, and the power supply 5 is solder bonded to one of the ends or terminals of the hard circuit board 22 in a manner such that the printed circuit board of the power supply 5 is not parallel but may be perpendicular to the hard circuit board 22 to save space in the longitudinal direction used for the end cap. This solder bonding technique may be more convenient to accomplish and the effective illuminating areas of the LED tube lamp could also remain. Moreover, a conductive lead 53 for electrical connection with the end cap 3 could be formed directly on the power supply 5 without soldering other metal wires between the power supply 5 and the hollow conductive pin 301 as shown in FIG. 3, and which facilitates the manufacturing of the LED tube lamp.

Referring to FIG. 37, in one embodiment, each of the LED light sources 202 may be provided with an LED lead frame 202b having a recess 202a, and an LED chip 18 disposed in the recess 202a. The recess 202a may be one or more than one in amount. The recess 202a may be filled with phosphor covering the LED chip 18 to convert emitted light therefrom into a desired light color. Compared with a conventional LED chip being a substantial square, the LED chip 18 in this embodiment may be preferably rectangular with the dimension of the length side to the width side at a ratio ranges generally from about 2:1 to about 10:1, in some embodiments from about 2.5:1 to about 5:1, and in some more desirable embodiments from about 3:1 to about 4.5:1. Moreover, the LED chip 18 is in some embodiments arranged with its length direction extending along the length direction of the lamp tube 1 to increase the average current density of the LED chip 18 and improve the overall illumination field shape of the lamp tube 1. The lamp tube 1 may have a number of LED light sources 202 arranged into one or more rows, and each row of the LED light sources 202 is arranged along the length direction (Y-direction) of the lamp tube 1.

Referring again to FIG. 37, the recess 202a is enclosed by two parallel first sidewalls 15 and two parallel second sidewalls 16 with the first sidewalls 15 being lower than the second sidewalls 16. The two first sidewalls 15 are arranged to be located along a length direction (Y-direction) of the lamp tube 1 and extend along the width direction (X-direction) of the lamp tube 1, and two second sidewalls 16 are arranged to be located along a width direction (X-direction) of the lamp tube 1 and extend along the length direction (Y-direction) of the lamp tube 1. The extending direction of the first sidewalls 15 may be substantially rather than exactly parallel to the width direction (X-direction) of the lamp tube 1, and the first sidewalls may have various outlines such as zigzag, curved, wavy, and the like. Similarly, the extending direction of the second sidewalls 16 may be substantially rather than exactly parallel to the length direction (Y-direction) of the lamp tube 1, and the second sidewalls may have various outlines such as zigzag, curved, wavy, and the like. In one row of the LED light sources 202, the arrangement of the first sidewalls 15 and the second sidewalls 16 for each LED light source 202 can be same or different.

Having the first sidewalls 15 being lower than the second sidewalls 16 and proper distance arrangement, the LED lead frame 202b allows dispersion of the light illumination to cross over the LED lead frame 202b without causing uncomfortable visual feeling to people observing the LED tube lamp along the Y-direction. In some embodiments, the first sidewalls 15 may not be lower than the second sidewalls, however, and in this case the rows of the LED light sources 202 are more closely arranged to reduce grainy effects. On the other hand, when a user of the LED tube lamp observes the lamp tube thereof along the X-direction, the second sidewalls 16 also can block user's line of sight from seeing the LED light sources 202, and which reduces unpleasing grainy effects.

Referring again to FIG. 37, the first sidewalls 15 each includes an inner surface 15a facing toward outside of the recess 202a. The inner surface 15a may be designed to be an inclined plane such that the light illumination easily crosses over the first sidewalls 15 and spreads out. The inclined plane of the inner surface 15a may be flat or cambered or combined shape. In some embodiments, when the inclined plane is flat, the slope of the inner surface 15a ranges from about 30 degrees to about 60 degrees. Thus, an included angle between the bottom surface of the recess 202a and the inner surface 15a may range from about 120 to about 150 degrees. In some embodiments, the slope of the inner surface 15a ranges from about 15 degrees to about 75 degrees, and the included angle between the bottom surface of the recess 202a and the inner surface 15a ranges from about 105 degrees to about 165 degrees.

There may be one row or several rows of the LED light sources 202 arranged in a length direction (Y-direction) of the lamp tube 1. In case of one row, in one embodiment, the second sidewalls 16 of the LED lead frames 202b of all of the LED light sources 202 located in the same row are disposed in same straight lines to respectively form two walls for blocking the user's line of sight seeing the LED light sources 202. In case of several rows, in some embodiments, only the LED lead frames 202b of the LED light sources 202 disposed in the outermost two rows are disposed in same straight lines to respectively form walls for blocking user's line of sight seeing the LED light sources 202. In case of several rows, it may be required only that the LED lead frames 202b of the LED light sources 202 disposed in the outermost two rows are disposed in same straight lines to respectively from walls for blocking user's line of sight seeing the LED light sources 202. The LED lead frames 202b of the LED light sources 202 disposed in the other rows can have different arrangements. For example, as far as the LED light sources 202 located in the middle row (third row) are concerned, the LED lead frames 202b thereof may be arranged such that: each LED lead frame 202b has the first sidewalls 15 arranged along the length direction (Y-direction) of the lamp tube 1 with the second sidewalls 16 arranged along in the width direction (X-direction) of the lamp tube 1; each LED lead frame 202b has the first sidewalls 15 arranged along the width direction (X-direction) of the lamp tube 1 with the second sidewalls 16 arranged along the length direction (Y-direction) of the lamp tube 1; or the LED lead frames 202b are arranged in a staggered manner. To reduce grainy effects caused by the LED light sources 202 when a user of the LED tube lamp observes the lamp tube thereof along the X-direction, it may be enough to have the second sidewalls 16 of the LED lead frames 202b of the LED light sources 202 located in the outmost rows to block user's line of sight from seeing the LED light sources 202. Different arrangements may be used for the second sidewalls 16 of the LED lead frames 202b of one or several of the LED light sources 202 located in the outmost two rows.

In summary, when a plurality of the LED light sources 202 are arranged in a row extending along the length direction of the lamp tube 1, the second sidewalls 16 of the LED lead frames 202b of all of the LED light sources 202 located in the same row may be disposed in same straight lines to respectively form walls for blocking user's line of sight seeing the LED light sources 202. When a plurality of the LED light sources 202 are arranged in a number of rows being located along the width direction of the lamp tube 1 and extending along the length direction of the lamp tube 1, the second sidewalls 16 of the LED lead frames 202b of all of the LED light sources 202 located in the outmost two rows may be disposed in straight lines to respectively form two walls for blocking user's line of sight seeing the LED light sources 202. The one or more than one rows located between the outmost rows may have the first sidewalls 15 and the second sidewalls 16 arranged in a way the same as or different from that for the outmost rows.

The LED tube lamps according to various different embodiments of the present invention are described as above. With respect to an entire LED tube lamp, the features including "having the structure-strengthened end region", "adopting the bendable circuit sheet as the LED light strip", "coating the adhesive film on the inner surface of the lamp tube", "coating the diffusion film on the inner surface of the lamp tube", "covering the diffusion film in form of a sheet above the LED light sources", "coating the reflective film on the inner surface of the lamp tube", "the end cap including the thermal conductive member", "the end cap including the magnetic metal member", "the LED light source being provided with the lead frame", and "utilizing the circuit board assembly to connect the LED light strip and the power supply" may be applied in practice singly or integrally such that only one of the features is practiced or a number of the features are simultaneously practiced.

Furthermore, any of the features "having the structure-strengthened end region", "adopting the bendable circuit sheet as the LED light strip", "coating the adhesive film on the inner surface of the lamp tube", "coating the diffusion film on the inner surface of the lamp tube", "covering the diffusion film in form of a sheet above the LED light sources", "coating the reflective film on the inner surface of the lamp tube", "the end cap including the thermal conductive member", "the end cap including the magnetic metal member", "the LED light source being provided with the lead frame", "utilizing the circuit board assembly (including a long circuit sheet and a short circuit board) to connect the LED light strip and the power supply", "a rectifying circuit", "a filtering circuit", "a driving circuit", "a terminal adapter circuit", "an anti-flickering circuit", "a protection circuit", "a mode switching circuit", "an overvoltage protection circuit", "a ballast detection circuit", "a ballast-compatible circuit", "a filament-simulating circuit", and "an auxiliary power module" includes any related technical points and their variations and any combination thereof as described in the abovementioned embodiments of the present invention.

As an example, the feature "having the structure-strengthened end region" may include "the lamp tube includes a main body region, a plurality of rear end regions, and a transition region connecting the main body region and the rear end regions, wherein the two ends of the transition region are arc-shaped in a cross-section view along the axial direction of the lamp tube; the rear end regions are respectively sleeved with end caps; the outer diameter of at least one of the rear end regions is less than the outer diameter of the main body region; the end caps have same outer diameters as that of the main body region."

As an example, the feature "adopting the bendable circuit sheet as the LED light strip" includes "the connection between the bendable circuit sheet and the power supply is by way of wire bonding or soldering bonding; the bendable circuit sheet includes a wiring layer and a dielectric layer arranged in a stacked manner; the bendable circuit sheet has a circuit protective layer made of ink to reflect lights and has widened part along the circumferential direction of the lamp tube to function as a reflective film."

As an example, the feature "coating the diffusion film on the inner surface of the lamp tube" may include "the composition of the diffusion film includes calcium carbonate, halogen calcium phosphate and aluminum oxide, or any combination thereof, and may further include thickener and a ceramic activated carbon; the diffusion film may be a sheet covering the LED light source."

As an example, the feature "coating the reflective film on the inner surface of the lamp tube" may include "the LED light sources are disposed above the reflective film, within an opening in the reflective film or beside the reflective film."

As an example, the feature "the end cap including the thermal conductive member" may include "the end cap includes an electrically insulating tube, the hot melt adhesive is partially or completely filled in the accommodation space between the inner surface of the thermal conductive member and the outer surface of the lamp tube." The feature "the end cap including the magnetic metal member" may include "the magnetic metal member is circular or non-circular, has openings or indentation/embossment to reduce the contact area between the inner peripheral surface of the electrically insulating tube and the outer surface of the magnetic metal member; has supporting portions and protruding portions to support the magnetic metal member or reduce the contact area between the electrically insulating tube and the magnetic metal member."

As an example, the feature "the LED light source being provided with the lead frame" may include "the lead frame has a recess for receive an LED chip, the recess is enclosed by first sidewalls and second sidewalls with the first sidewalls being lower than the second sidewalls, wherein the first sidewalls are arranged to locate along a length direction of the lamp tube while the second sidewalls are arranged to locate along a width direction of the lamp tube."

As an example, the feature "utilizing the circuit board assembly to connect the LED light strip and the power supply" may include "the circuit board assembly has a long circuit sheet and a short circuit board that are adhered to each other with the short circuit board being adjacent to the side edge of the long circuit sheet; the short circuit board is provided with a power supply module to form the power supply; the short circuit board is stiffer than the long circuit sheet."

According to the design of the LED module of the power supply module, the LED module comprises plural strings of LEDs connected in parallel with each other, wherein each LED may have a single LED chip or plural LED chips emitting different spectrums. Each LEDs in different LED strings may be connected with each other to form a mesh connection.

The above-mentioned features of the present invention can be accomplished in any combination to improve the LED tube lamp, and the above embodiments are described by way of example only. The present invention is not herein limited, and many variations are possible without departing from the spirit of the present invention and the scope as defined in the appended claims.

What is claimed is:

1. A thermo-compression head for heating a solder and bonding at least one first soldering pad on a first object and at least one second soldering pad on a second object, the first object overlaying a part of the second object, the at least one second soldering pad being between the first object and the second object, the at least one first soldering pad being aligned with the at least one second soldering pad, wherein the thermo-compression head comprises:
 a bonding plane for touching the second object;
 a restraining plane adjacent to the bonding plane for touching the first object;
 at least one concave guiding tank formed on the bonding plane, and wherein an end of the at least one concave guiding tank is opened near an edge of the bonding plane while an opposite end of the at least one concave guiding tank is closed; and
 at least one concave molding tank formed on the restraining plane and positioned beside the at least one concave guiding tank, and wherein the at least one concave molding tank communicates with the at least one concave guiding tank via the open end of the at least one concave guiding tank.

2. The thermo-compression head according to claim 1, wherein the at least one concave molding tank is more depressed than the at least one concave guiding tank.

3. The thermo-compression head according to claim 1, wherein the restraining plane is lower than the bonding plane to form a difference of height of the bonding plane and the restraining plane.

4. The thermo-compression head according to claim 3, wherein the difference of the height of the bonding plane and the restraining plane is substantially equal to a thickness of the first object.

5. The thermo-compression head according to claim 1, wherein an end of the at least one concave molding tank is opened near an edge of the restraining plane to communicate with the at least one concave guiding tank while an opposite end of the at least one concave molding tank is opened near an opposite edge of the restraining plane.

6. The thermo-compression head according to claim 1, wherein the restraining plane has a strip-like structure or a grid-like structure on a surface for pressing the first object.

7. The thermo-compression head according to claim 1, wherein the bonding plane has a surface being flat, concave, or convex for touching the second object.

8. The thermo-compression head according to claim 1, wherein the first object is an LED light strip, the second object is a power supply, the at least one first soldering pad is on a side of the LED light strip away from the power supply, and the at least one first soldering pad is formed with a through hole and is able to be connected to the at least one second soldering pad via the through hole.

9. The thermo-compression head according to claim 1, further comprising a rotary linkage mechanism, wherein the bonding plane and the restraining plane are connected to the rotary linkage mechanism.

10. The thermo-compression head according to claim 9, further comprising a pressure sensor, wherein the pressure sensor detects the pressure applied to the bonding plane or the restraining plane.

11. A soldering system for heating a solder and bonding at least one first soldering pad on a first object and at least one second soldering pad on a second object, the first object overlaying a part of the second object, the at least one second soldering pad being between the first object and the second object, the at least one first soldering pad being aligned with the at least one second soldering pad, wherein the soldering system comprises:
 a soldering vehicle comprising:
  a rotary platform for holding the first object and the second object; and
  a vehicle holder bearing the rotary platform, wherein the rotary platform is able to rotate with respect to the vehicle holder; and
 a thermo-compression head positioned corresponding to the rotary platform, the thermo-compression head comprising:
  a bonding plane for touching the second object;
  a restraining plane adjacent to the bonding plane for touching the first object;
  at least one concave guiding tank formed on the bonding plane, wherein an end of the at least one concave guiding tank is opened near an edge of the bonding plane while an opposite end of the at least one concave guiding tank is closed; and
  at least one concave molding tank formed on the restraining plane and positioned beside the at least one concave guiding tank, wherein the at least one concave molding tank communicates with the at least one concave guiding tank via the open end of the at least one concave guiding tank.

12. The soldering system according to claim 11, wherein the bonding plane has a surface being flat, concave, or convex for touching the second object.

13. The soldering system according to claim 11, wherein the bonding plane is for heating a solder.

14. The soldering system according to claim 11, wherein the first object is an LED light strip, the second object is a power supply, the at least one first soldering pad is on a side of the LED light strip away from the power supply, and the at least one first soldering pad is formed with a through hole and is able to be connected to the at least one second soldering pad via the through hole.

15. An LED tube lamp manufactured by a soldering system for heating a solder and bonding at least one first soldering pad on a first object and at least one second soldering pad on a second object, the first object overlaying a part of the second object, the at least one second soldering pad being between the first object and the second object, the at least one first soldering pad being aligned with the at least one second soldering pad, wherein the soldering system comprises:
 a soldering vehicle comprising:
  a rotary platform for holding the first object and the second object; and
  a vehicle holder bearing the rotary platform, wherein the rotary platform is able to rotate with respect to the vehicle holder; and
 a thermo-compression head positioned corresponding to the rotary platform, the thermo-compression head comprising:
  a bonding plane for touching the second object;
  a restraining plane adjacent to the bonding plane for touching the first object;
  at least one concave guiding tank formed on the bonding plane, wherein an end of the at least one concave guiding tank is opened near an edge of the bonding plane while an opposite end of the at least one concave guiding tank is closed; and
  at least one concave molding tank formed on the restraining plane and positioned beside the at least one concave guiding tank, wherein the at least one concave molding tank communicates with the at least one concave guiding tank via the open end of the at least one concave guiding tank.

16. The LED tube lamp according to claim 15, comprising:
 a lamp tube;
 two end caps respectively at two opposite ends of the lamp tube;
 a power supply in one or separately both of the end caps; and
 an LED light strip in the lamp tube, the LED light strip being provided with a plurality of LED light sources mounted thereon, the LED light sources being electrically connected to the power supply via the LED light strip;
 wherein the first object is the LED light strip, the second object is the power supply, the LED light strip overlays a part of the power supply, the LED light strip comprises the at least one first soldering pad, the power supply comprises the at least one second soldering pad, the at least one second soldering pad is between the LED light strip and the power supply, the at least one first soldering pad is aligned with the at least one second soldering pad, and the at least one first soldering pad is connected to the at least one second soldering pad via a solder.

17. The LED tube lamp according to claim 16, wherein the at least one first soldering pad is on a side of the LED light strip away from the power supply, and the at least one first soldering pad is formed with a through hole and is connected to the at least one second soldering pad via the through hole.

18. The LED tube lamp according to claim 17, wherein a part of the solder is in the through hole and another part of the solder is around an edge of the LED light strip.

19. The LED tube lamp according to claim 16, wherein the two end caps have different sizes in a length direction along the axle of the end caps.

20. The LED tube lamp according to claim 19, wherein the size of one of the end caps is substantially 30% to 80% times the size of the other one of the end caps.

* * * * *